United States Patent
Tanase et al.

(10) Patent No.: US 7,071,138 B2
(45) Date of Patent: Jul. 4, 2006

(54) SOLID CATALYST COMPONENT FOR OLEFIN POLYMERIZATION, CATALYST FOR OLEFIN POLYMERIZATION AND PROCESS FOR PRODUCING OLEFIN POLYMER

(75) Inventors: Shojiro Tanase, Ichihara (JP); Takanori Sadashima, Ichihara (JP)

(73) Assignee: Idemitsu Petrochemical Co., LTD (JP)

( * ) Notice: Subject to any disclaimer, the term of this patent is extended or adjusted under 35 U.S.C. 154(b) by 14 days.

(21) Appl. No.: 10/493,550

(22) PCT Filed: Nov. 1, 2002

(86) PCT No.: PCT/JP02/11429

§ 371 (c)(1),
(2), (4) Date: Apr. 22, 2004

(87) PCT Pub. No.: WO03/037939

PCT Pub. Date: May 8, 2003

(65) Prior Publication Data

US 2004/0266609 A1    Dec. 30, 2004

(30) Foreign Application Priority Data

| Nov. 1, 2001 | (JP) | 2001-336660 |
| Nov. 1, 2001 | (JP) | 2001-336661 |
| Nov. 1, 2001 | (JP) | 2001-336662 |
| Nov. 1, 2001 | (JP) | 2001-336663 |
| May 10, 2002 | (JP) | 2002-135228 |
| May 10, 2002 | (JP) | 2002-135229 |

(51) Int. Cl.
*C08F 4/649* (2006.01)
*C08F 4/642* (2006.01)

(52) U.S. Cl. .............. 502/120; 502/115; 502/125; 502/128; 526/124.9; 526/124.2; 526/125.3

(58) Field of Classification Search .......... 502/115, 502/120, 125, 128; 526/124.9, 124.2, 125.3
See application file for complete search history.

(56) References Cited

FOREIGN PATENT DOCUMENTS

| JP | 56-24408 | 3/1981 |
| JP | 56-104907 | 8/1981 |
| JP | 58-811 | 1/1983 |
| JP | 60-49005 | 3/1985 |
| JP | 61-174206 | 8/1986 |
| JP | 61-291604 | 12/1986 |
| JP | 62-158704 | 7/1987 |
| JP | 63-168413 | 7/1988 |
| JP | 63-280707 | 11/1988 |
| JP | 64-69608 | 3/1989 |
| JP | 4-130107 | 5/1992 |
| JP | 4-506833 | 11/1992 |
| JP | 4-370104 | 12/1992 |
| JP | 4-506985 | 12/1992 |
| JP | 5-301918 | 11/1993 |
| JP | 7-17695 | 3/1995 |
| JP | 7-25822 | 3/1995 |
| JP | 11-269218 | 10/1999 |

*Primary Examiner*—Caixia Lu
(74) *Attorney, Agent, or Firm*—Steptoe & Johnson LLP

(57) ABSTRACT

A solid catalyst component for olefin polymerization in which the molar ratio of residual alkoxy groups to supported titanium is 0.60 or less is obtained by reacting the following compound (a1) with the following compound (b1) at a hydroxyl group/magnesium molar ratio of 1.0 or more, reacting the reaction mixture with the following compound (c1) at a halogen/magnesium molar ratio of 0.20 or more, reacting the resultant reaction mixture with the following compounds (d1) and (e) at a temperature of 120° C. or higher but 150° C. or lower, washing the reaction mixture with an inert solvent, reacting the reaction mixture with the following compound (e) again at the above temperature and washing the reaction mixture with an inert solvent, whereby there can be provided the solid catalyst component for olefin polymerization and a catalyst for olefin polymerization which have high polymerization activity and give an olefin polymer having a less residual Cl content and being excellent in stereoregularity and powder form and a process for producing an olefin polymer, (a1) an oxide of at least one element that is selected from Group II to Group IV elements and which supports an alcohol-free halogen-containing magnesium compound,
(b1) an alcohol,
(c1) a halogen-containing silicon compound,
(d1) an electron-donating compound, and
(e) a halogen-containing titanium compound.

26 Claims, 4 Drawing Sheets

SOLID CATALYST COMPONENT FOR OLEFIN POLYMERIZATION, CATALYST FOR OLEFIN POLYMERIZATION AND PROCESS FOR PRODUCING OLEFIN POLYMER

TECHNICAL FIELD

The present invention relates to a solid catalyst component for olefin polymerization for producing an α-olefin homopolymer or copolymer, a catalyst for olefin polymerization and a process for producing an olefin polymer.

TECHNICAL BACKGROUND

Generally, an olefin polymer is produced by polymerization in the presence of a Ziegler-Natta catalyst containing a titanium compound and an organic aluminum compound. For example, in the production of a polypropylene that is one of olefin polymers, an isotactic polypropylene is obtained mainly in the presence of a catalyst containing a solid catalyst component formed mainly from titanium, magnesium, chlorine and an electron-donating compound and containing an organic aluminum compound as a co-catalyst component and an organosilicon compound having an alkoxy group as a stereoregularity improver. Attempts are presently made to attain an improvement in the catalytic activity during polymerization, an improvement in stereoregularity of an olefin polymer, an improvement in the form of a polymer powder for stable production of an olefin polymer and a reduction in residual Cl in the polymer.

When the above residual Cl in a polymer is large in amount, for example, the Cl corrodes a mold for injection molding, a polymer absorbs water during the production of a biaxially oriented film or its spinning to cause foaming, or a foreign matter containing an additive is formed, which makes high-speed molding difficult, so that it is a big issue to decrease the amount of residual Cl in a polymer.

As means for overcoming the problem of residual Cl in a polymer, first, it is general practice to employ a method in which a catalyst is improved in activity. In the second place, it is also general practice to employ a method in which a non-organic material such as silica is allowed to support a magnesium compound to substantially decrease a magnesium chloride content, i.e., a Cl content in a catalyst.

For example, there is known a method in which silica, butyl octyl magnesium and hydrogen chloride gas are brought into contact to form a magnesium-chloride-supporting silica support, the thus-prepared support is treated with an alcohol and then the support is allowed to carry titanium tetrachloride and an electron-donating compound (JP-A-63-280707) or a method in which a mixture of silicon tetrachloride with silane trichloride is brought into contact with a product prepared by bringing silica and butyl octyl magnesium into contact, then, the resultant mixture is washed with an inert solvent to form a magnesium-chloride-supporting silica support, and the thus-prepared support is treated with an alcohol and then allowed to carry titanium tetrachloride and an electron-donating compound (Japanese Specification Publication No. 4-506833 of PCT Application).

Further, there is also known a method in which silica, butyl ethyl magnesium and ethanol are brought into contact to form a magnesium-ethoxide-supporting silica support, the thus-formed support is reacted with silicon tetrachloride and then washed with heptane, and the thus-prepared support is further reacted with an electron-donating compound at 50° C. and with titanium tetrachloride at 90° C. once each (JP-A-61-174206), a method in which silica is impregnated with a mixture of magnesium chloride with butanol to form a silica support supporting a butanol complex of magnesium chloride and the silica support is allowed to carry titanium tetrachloride and an electron-donating compound (JP-A-63-168413), or a method in which silica pre-treated with trimethyl chlorosilane is allowed to carry diethoxymagnesium and then allowed to carry titanium tetrachloride and an electron-donating compound (JP-B-7-17695).

However, while olefin polymers obtained by the above methods have certain performances, particularly, the above methods or the olefin polymers are not fully satisfactory in polymerization activity, stereoregularity, residual Cl, and the like.

On the other hand, as a method of improving olefin polymers in the morphology including a particle diameter and a form, JP-A-58-000811 discloses a method in which a magnesium compound is once dissolved in a solvent such as an alcohol and then re-precipitated and the thus-obtained precipitate is used.

In the above method, however, it is essential to carry out the procedures of supporting, dissolving and precipitation of a magnesium compound, so that there are defects that steps thereof are complicated and that a catalyst is poor in stability of performances. Further, the above method also has another defect that the catalyst activity during polymerization and the stereoregularity of an olefin polymer are not sufficient.

As a method of overcoming the above defects, therefore, JP-A-2-02-413883 discloses a method in which metal magnesium, an alcohol and a specific amount of a halogen reaction product are used as a support for a catalyst, and JP-B-07-025822 discloses a method of producing an olefin polymer in the presence of a Ziegler-Natta catalyst containing a solid catalyst component obtained by adding an organic acid ester to a reaction product from alkoxymagnesium, a halogenating agent and alkoxytitanium and further reacting a titanium halide with the resultant mixture.

Further, there is known a method of producing an olefin polymer in the presence of a solid catalyst component obtained by suspending diethoxymagnesium in alkylbenzene, reacting the diethoxymagnesium with predetermined amounts of titanium tetrachloride and phthalic acid diester at a temperature of 80° C. or higher but 120° C. or lower, to obtain a solid substance, washing the solid substance with alkylbenzene and reacting the solid substance with a predetermined amount of titanium tetrachloride in the presence of alkylbenzene (JP-A-64-69608).

In these methods, however, the catalytic activity during polymerization and the stereoregularity of olefin polymers are not yet sufficient.

Further, JP-A-11-269218 discloses a solid catalyst component for olefin polymerization, obtained by bringing a magnesium compound and a titanium compound into contact with each other in the presence of an electron-donating compound at a temperature of 120° C. or higher but 150° C. or lower and then washing the reaction mixture with an inert solvent at a temperature of 100° C. or higher but 150° C. or lower. There are produced effects that a decrease in the catalytic activity with the passage of time during polymerization is suppressed and that an olefin polymer is improved in stereoregularity.

Since, however, the polymerization activity of the above catalyst is not necessarily fully satisfactory, the catalyst needs a further improvement in this activity.

It is an object of the present invention to provide a solid catalyst component for olefin polymerization, which has high polymerization activity and which gives an olefin polymer excellent in stereoregularity, residual Cl and the state of a powder, a catalyst for olefin polymerization and a process for producing an olefin polymer.

For achieving the above object, the present inventors have made diligent studies and as a result have found that a solid catalyst component for olefin polymerization, of which the residual alkoxy-group content is remarkably decreased, can be obtained by a specific production method, and that the above problems can be thereby overcome. The present invention has been accordingly completed.

DISCLOSURE OF THE INVENTION

[A1] Solid Catalyst Component for Olefin Polymerization

According to the present invention, there is provided a solid catalyst component for olefin polymerization, which is a reaction product from the following compounds (a1), (b1), (c1), (d1) and (e), and which is obtained by reacting the following compound (a1) with the following compound (b1) at a hydroxyl group/magnesium molar ratio of 1.0 or more, then, reacting the following compound (a1) with the following compound (c1) at a halogen/magnesium molar ratio of 0.20 or more, reacting a reaction product from the following compounds (a1), (b1) and (c1) with the following compound (d1) and the following compound (e) at a temperature of 120° C. or higher but 150° C. or lower, washing the resultant reaction mixture with an inert solvent, then, reacting the following compound (e) again at a temperature of 120° C. or higher but 150° C. or lower and washing the resultant reaction mixture with an inert solvent, (a1) an oxide of at least one element that is selected from Group II to Group IV elements and which supports an alcohol-free halogen-containing magnesium compound, (b1) an alcohol, (c1) a halogen-containing silicon compound, (d1) an electron-donating compound, and (e) a halogen-containing titanium compound.

When prepared in the above manner, there can be obtained a solid catalyst component that has high polymerization activity and which can give an olefin polymer having a less residual Cl content and having excellence in stereoregularity and a powder form.

Particularly, when the hydroxyl group/magnesium molar ratio is adjusted to 1.0 or more, the crystallizability of a halogen-containing magnesium compound supported on an oxide of at least one of Group II to Group IV elements can be decreased, and there can be produced a support for supporting an effective active species.

Further, when the halogen/magnesium molar ratio is adjusted to 0.20 or more, an alcohol component that forms a complex, or reacts, with a halogen-containing magnesium compound supported on an oxide of at least one of the Group II to Group II elements can be efficiently extracted from the solid surface.

Presumably, the above preparation method promotes a reaction of an alcohol or an alkoxy group contained in a reaction product from the compounds (a1) and (b1) with the compounds (c1) and (e), so that the alkoxy group imparted directly to the magnesium compound is decreased, and alkoxytitanium, etc., produced as by-products come to be easily extracted from the solid surface.

The above "again" means once or more. That is, after the compounds (a1) to (e) are allowed to react, the resultant reaction mixture and the compound (e) may be further reacted at least once (e.g., once, twice or more).

Further, the temperature for washing the reaction mixture obtained after the first reaction of the compounds (a1) to (e) with an inert solvent is preferably at 100° C. or higher, but 150° C. or lower.

Further, the molar ratio (RO/Ti) of residual alkoxy groups (RO) to the supported titanium (Ti) is preferably 0.60 or less.

According to another aspect of the present invention, there is provided a solid catalyst component for olefin polymerization, which is a reaction product from the following compounds (a1), (b1), (c1), (d1) and (e) and in which the molar ratio (RO/Ti) of residual alkoxy groups (RO) to supported titanium (Ti) is 0.60 or less, (a1) an oxide of at least one element that is selected from Group II to Group IV elements and which supports an alcohol-free halogen-containing magnesium compound, (b1) an alcohol, (c1) a halogen-containing silicon compound, (d1) an electron-donating compound, and (e) a halogen-containing titanium compound.

When the molar ratio (RO/Ti) is adjusted to 0.60 or less, there can be obtained a solid catalyst component that has high polymerization activity and which can give an olefin polymer having a less residual Cl content and having excellence in stereoregularity and a powder form.

Further, the alcohol (b1) is preferably ethanol.

Further, the halogen-containing silicon compound (c1) is preferably silicon tetrachloride.

The rate and reaction ratio of halogenation and dealkoxylation of a reaction product, which is from the compound (a1) and the compound (b1), with silicon tetrachloride can be fully controlled presumably due to the use of silicon tetrachloride.

Further, the molar ratio (RO/Ti) is preferably 0.45 or less.

The content of the residual alkoxy group (RO) is preferably 0.40 mmol/g or less.

The amount of the supported titanium is preferably 1.0% by weight or more.

[A2] Solid Catalyst Component for Olefin Polymerization

According to the present invention, there is provided a solid catalyst component for olefin polymerization, which is a reaction product obtained by reacting the following compounds (a2) and (b2-1), reacting the reaction mixture with the following compounds (c2) and (d2) at a temperature of 120° C. or higher but 150° C. or lower, washing the reaction product with an inert solvent, then, reacting the following compound (d2) again at a temperature of 120° C. or higher but 150° C. or lower and washing the reaction product with an inert solvent, (a2) an oxide of at least one element selected from the Group II to Group IV elements, the oxide supporting an alkoxy-group-containing magnesium compound or an alcohol complex of a halogen-containing magnesium compound, (b2-1) a halogen-containing silicon compound whose amount as a halogen/magnesium molar ratio is at least 0.20 based on the oxide (a2), (c2) an electron-donating compound, and (d2) a halogen-containing titanium compound.

When a solid catalyst component is prepared in the above manner, the content of residual alkoxy groups can be decreased, the solid catalyst component has high polymerization activity, and there can be obtained an olefin polymer having a less residual Cl content and having excellence in stereoregularity and a powder form.

Particularly, when the amount, as a halogen/magnesium molar ratio, of the compound (b2-1) is adjusted to 0.20 or more, alkoxy groups or an alcohol in the alkoxy-groupcontaining magnesium compound or the alcohol complex of the halogen-containing magnesium compound can be efficiently extracted from the solid surface of the (a2) component.

When the above preparation method is employed, presumably, the reaction of the alkoxy groups or alcohol contained in the reaction product from the compound (a2) and the compound (b2-1) with the compound (d2) is promoted, the content of the alkoxy groups bonded to and contained in the magnesium compound or the alcohol forming a complex therewith is decreased, and alkoxytitanium etc. formed as a by-product comes to be easily extracted from the solid surface.

The above "again" means once or more. That is, after the compounds (a2) to (d2) are reacted, the resultant reaction product and the compound (d2) may be further reacted at least once (e.g., once, twice or more).

Further, preferably, the temperature for the washing with the inert solvent after the first reaction of the compounds (a2) to (d2) is 100° C. or higher but 150° C. or lower.

The molar ratio (RO/Ti) of residual alkoxy groups (RO) to the supported titanium (Ti) is preferably 0.70 or less.

According to another aspect of the present invention, there is provided a solid catalyst component for olefin polymerization, which is a reaction product obtained by reacting (a2) an oxide of at least one element selected from the Group II to Group IV elements, the oxide supporting an alkoxy-group-containing magnesium compound or an alcohol complex of a halogen-containing magnesium compound, (b2) a halogen-containing silicon compound, (c2) an electron-donating compound, and (d2) a halogen-containing titanium compound, and in which the molar ratio (RO/Ti) of residual alkoxy groups (RO) to supported titanium (Ti) is 0.70 or less.

When the molar ratio (RO/Ti) is adjusted to 0.70 or less, there can be obtained a solid catalyst component that has high polymerization activity and which can give an olefin polymer having a less residual Cl content and having excellence in stereoregularity and a powder form.

Further, each of the halogen-containing silicon compounds (b2) and (b2-1) is preferably silicon tetrachloride.

The rate and reaction ratio of halogenation and dealkoxylation reaction of the (a2) component with silicon tetrachloride can be fully controlled presumably due to the use of silicon tetrachloride.

Further, the molar ratio (RO/Ti) is preferably 0.50 or less.

The content of the residual alkoxy groups (RO) is preferably 0.5 mmol/g or less.

The amount of the supported titanium is preferably 1.0% by weight or more.

[A3] Solid Catalyst Component for Olefin Polymerization

According to the present invention, there is provided a solid catalyst component for olefin polymerization, which is a reaction product obtained by reacting the following compounds (a3) to (c3-1) (that is, compound (a3), compound (b3) and compound (c3-1)) or the following compounds (a3) to (d3) (that is, compound (a3), compound (b3), compound (c3-1) and compound (d3)) at a temperature of 120° C. or higher but 150° C. or lower, washing the reaction mixture with an inert solvent, further reacting the reaction mixture with the following halogen-containing titanium compound (a3) at least once (e.g., once, twice, or the like) at a temperature of 120° C. or higher but 150° C. or lower, and washing the reaction mixture with an inert solvent, (a3) a halogen-containing titanium compound, (b3) an alkoxy-group-containing magnesium compound, (c3-1) a halogen-containing silicon compound in which the molar ratio of halogen to the alkoxy group of the alkoxy-group-containing magnesium compound (b3) is 0.50 or more, (d3) an electron-donating compound.

When the solid catalyst component is prepared in the above manner, the content of residual alkoxy groups can be decreased, the solid catalyst component has high polymerization activity, and an olefin polymer excellent in the form of a powder can be obtained.

According to another aspect of the present invention, there is provided a solid catalyst component for olefin polymerization, which is obtained by reacting the following compounds (a3) to (c3) (that is, compound (a3), compound (b3) and compound (c3)) or the following compounds (a3) to (d3) (that is, compound (a3), compound (b3), compound (c3) and compound (d3)) and in which the molar ratio (RO/Ti) of residual alkoxy groups (RO) to supported titanium (Ti) is 0.30 or less, (a3) a halogen-containing titanium compound, (b3) an alkoxy-group-containing magnesium compound, (c3) a halogen-containing silicon compound, (d3) an electron-donating compound.

When the molar ratio (RO/Ti) is adjusted to 0.30 or less, the solid catalyst component has high polymerization activity, and an olefin polymer excellent in the form of a powder can be obtained.

In the compound (c3), preferably, the molar ratio of the halogen of the compound (c3) to the alkoxy group of the compound (b3) is 0.50 or more.

When the molar ratio is adjusted to 0.50 or more, presumably, the halogenation of the compound (b3) with the compound (c3) effectively proceeds, so that the halogenation degree of the compound (b3) is finally improved and that the formation of an alkoxytitanium compound expectably formed as a byproduct is inhibited, whereby the solid catalyst component is improved in polymerization activity.

In some cases, presumably, the halogenation of the compound (b3) with the compound (c3) proceeds in preference to the halogenation of the compound (b3) with the compound (a3), so that the halogenation rate of the compound (b3) is decreased, and that the formation of a finer catalyst, and the like are inhibited, whereby the solid catalyst component is excellent in a powder form.

By the above preparation method, presumably, the halogenation of the compound (b) with the compounds (a3) and (c3) is promoted, and an alkoxytitanium compound, etc., which are assumed to be formed as a byproduct, come to be easily extracted from a solid surface.

Further, the compound (b3) is preferably a compound obtained by reacting metal magnesium, an alcohol and a halogen and/or a halogen-containing compound containing at least 0.0001 gram atom, per mole of the metal magnesium, of halogen atoms.

When the amount of the halogen and/or halogen-containing compound is smaller than the above amount, the compound (b3) may come to have large and broad particle diameters, and the halogenation degree of the compound (b3) may be suppressed, and the extraction efficiency of alkoxytitanium, etc., may be decreased.

The use of the above compound (b3) can improve an olefin polymer in morphology. The above-prepared compound (b3) is nearly spherical and requires no classification procedures.

In the preparation of the solid catalyst component of the present invention, the electron-donating compound (d3) is used as required. The solid catalyst component obtained without the electron-donating compound (d3) is particularly suitable as a catalyst for the production of an ethylene homopolymer or an ethylene copolymer and has high polymerization activity.

[A4] Solid Catalyst Component for Olefin Polymerization

According to the present invention, there is provided a solid catalyst component for olefin polymerization, which is a reaction product obtained by reacting the following compounds (a4) and (b4) or the following compounds (a4), (b4) and (c4) in the presence of an aromatic hydrocarbon solvent at a temperature of 120° C. or higher but 150° C. or lower, washing the reaction mixture with an inert solvent, further reacting the following halogen-containing titanium compound (a4) at least once (e.g., once, twice, etc.) at a temperature of 120° C. or higher but 150° C. or lower and washing the reaction mixture with an inert solvent, (a4) a halogen-containing titanium compound, (b4) an alkoxy-group-containing magnesium compound, (c4) an electron-donating compound.

When the solid catalyst component is prepared in the above manner, the content of residual alkoxy groups in the solid catalyst component can be decreased, the solid catalyst component has high polymerization activity, and an olefin polymer excellent in a powder form can be obtained.

According to another aspect of the present invention, there is provided a solid catalyst component for olefin polymerization, which is a reaction product obtained by reacting the following compounds (a4) and (b4) or the following compounds (a4), (b4) and (c4) in the presence of an aromatic hydrocarbon solvent and in which the molar ratio (RO/Ti) of residual alkoxy groups (RO) to supported titanium (Ti) is 0.25 or less, (a4) a halogen-containing titanium compound, (b4) an alkoxy-group-containing magnesium compound, (c4) an electron-donating compound.

When the molar ratio (RO/Ti) is adjusted to 0.25 or less, there can be prepared a solid catalyst component having high polymerization activity and being capable of giving an olefin polymer excellent in a powder form.

In the preparation of the solid catalyst component of the present invention, the electron-donating compound (c4) is used as required. The solid catalyst component obtained without the electron-donating compound (c4) is particularly suitable as a catalyst for the production of an ethylene homopolymer or an ethylene copolymer and has high polymerization activity.

Further, preferably, the compound (b4) is an alkoxy-group-containing magnesium compound obtained by reacting metal magnesium, an alcohol and a halogen and/or halogen-containing compound containing at least 0.0001 gram atom, per mole of the above metal magnesium, of halogen atoms.

In this case, when the amount of the halogen and/or halogen-containing compound for use in the preparation of the compound (b4) is smaller than the above amount, the compound (b4) may come to have large and broad particle diameters, and the halogenation degree of the compound (b4) with the compound (a4) may be decreased, and the efficiency of extraction of alkoxytitanium adsorbed on the compound (b4) may be decreased.

The use of the above alkoxy-group-containing magnesium compound (b4) can improve an olefin polymer in morphology. The above-prepared alkoxy-group-containing magnesium compound (b4) is nearly spherical and requires no classification procedures.

By the above preparation method, presumably, the halogenation of the compound (b4) with the compound (a4) is promoted, and an alkoxytitanium compound, etc., which are assumed to be formed as a byproduct, come to be easily extracted from the surface of a solid that constitutes the solid catalyst component.

[Catalyst for Olefin Polymerization]

According to still another aspect of the present invention, there is provided a catalyst for olefin polymerization, containing the following components [A] and [B] or the following components [A], [B] and [C].

[A] any one of the above solid catalyst components [A1] to [A4] for olefin polymerization,

[B] an organic aluminum compound,

[C] an electron-donating compound.

The electron-donating compound [C] is incorporated as required. When this compound is incorporated, an olefin polymer can be sometimes improved in stereoregularity and/or the catalyst can be sometimes improved in polymerization activity.

[Process for Producing Olefin Polymer]

According to further another aspect of the present invention, there is provided a process for producing an olefin polymer, which comprises polymerizing an olefin in the presence of the above catalyst for olefin polymerization.

PREFERRED EMBODIMENTS OF THE INVENTION

Figure 1:
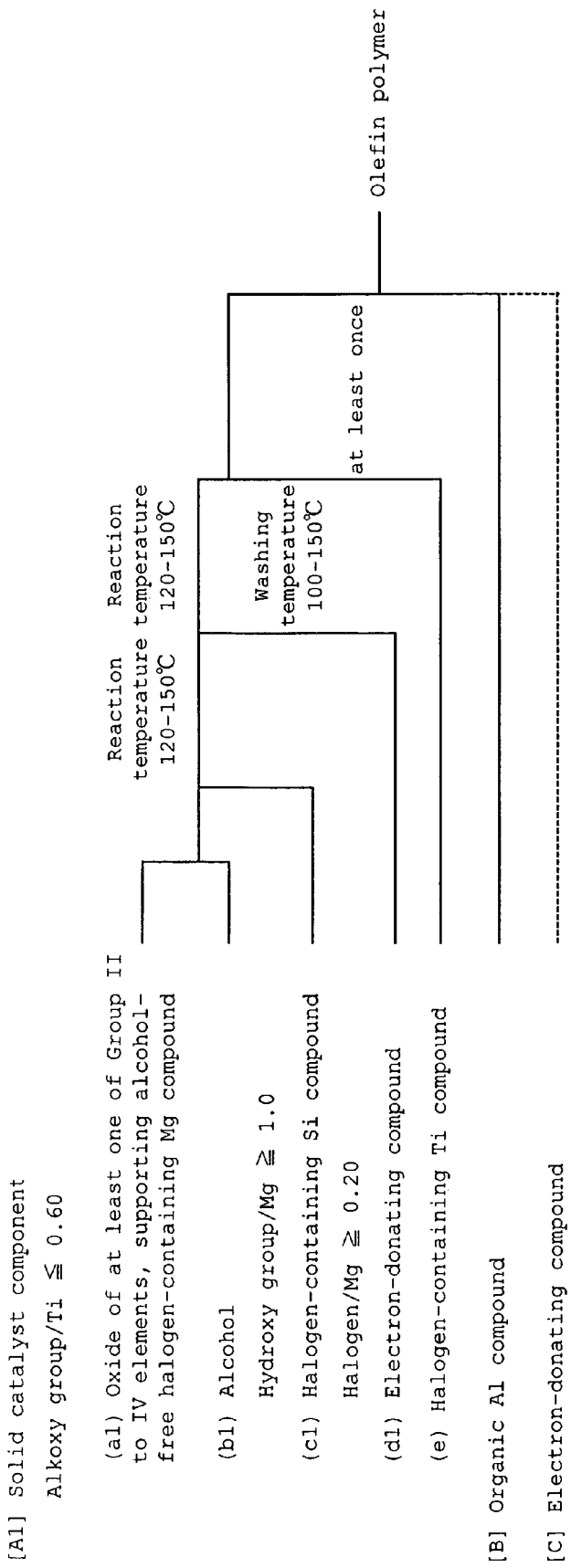
FIG. 1 is a schematic drawing for showing the catalyst for olefin polymerization, provided by the present invention, and a process for producing an olefin polymer.
Figure 2:
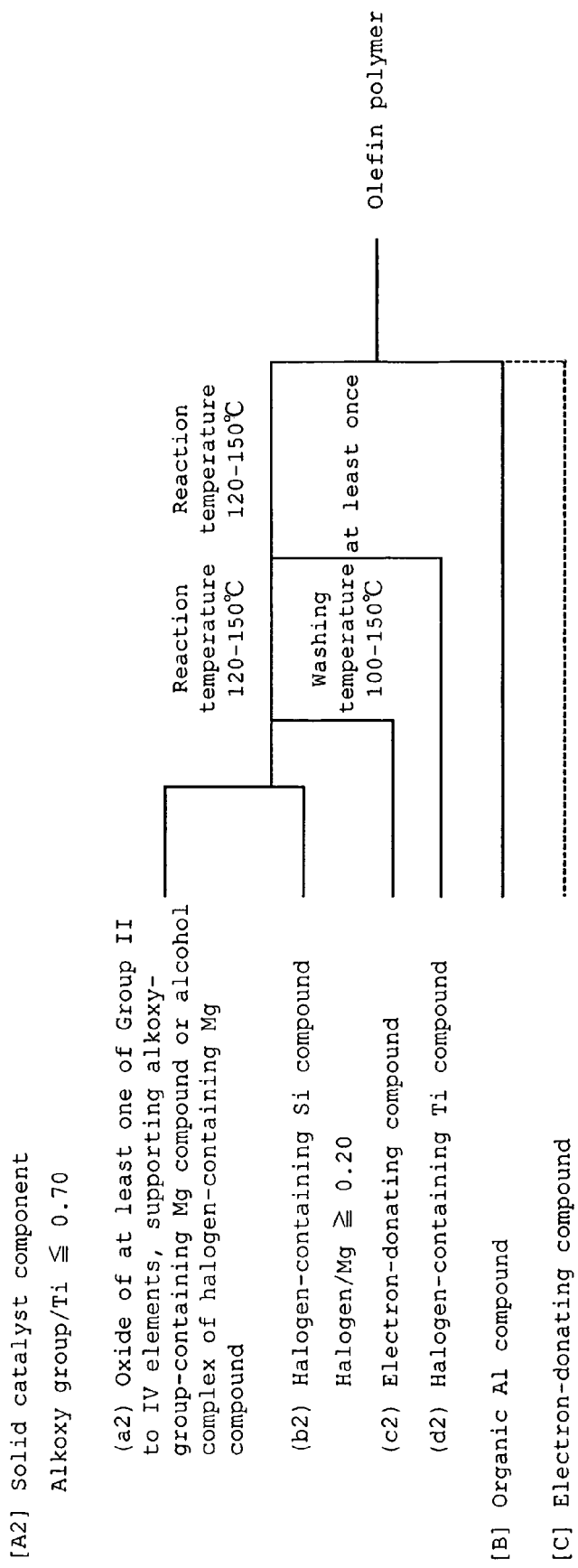
FIG. 2 is a schematic drawing for showing another catalyst for olefin polymerization, provided by the present invention, and a process for producing an olefin polymer.
Figure 3:
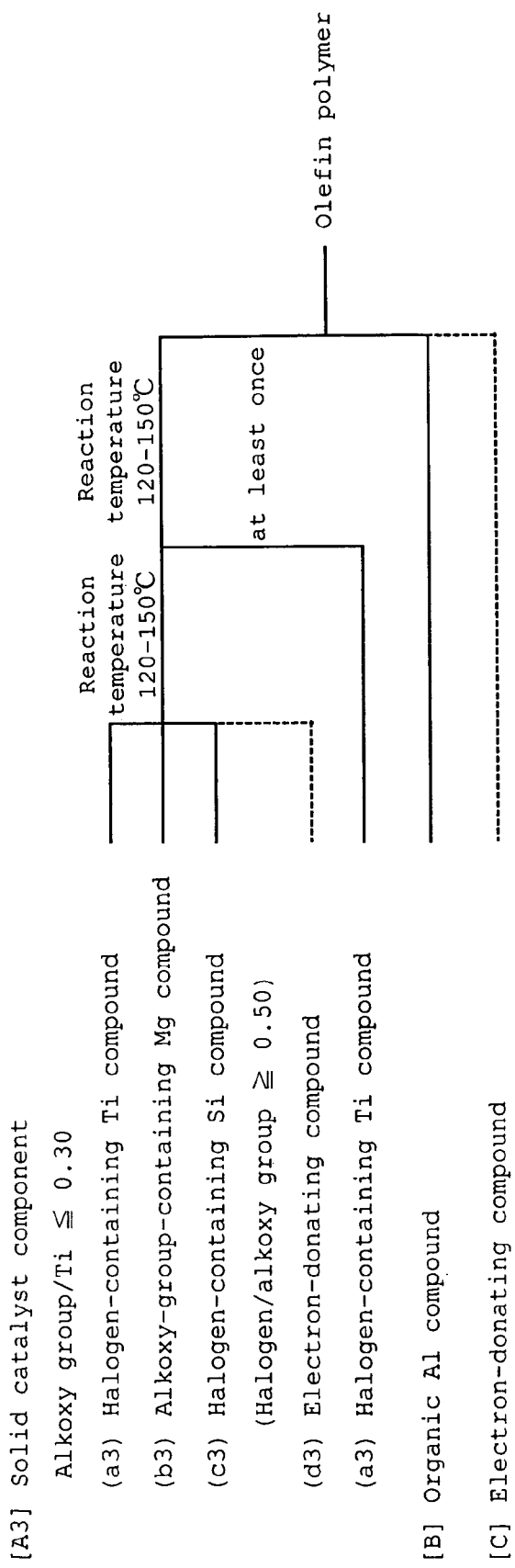
FIG. 3 is a schematic drawing for showing still another catalyst for olefin polymerization, provided by the present invention, and a process for producing an olefin polymer.
Figure 4:
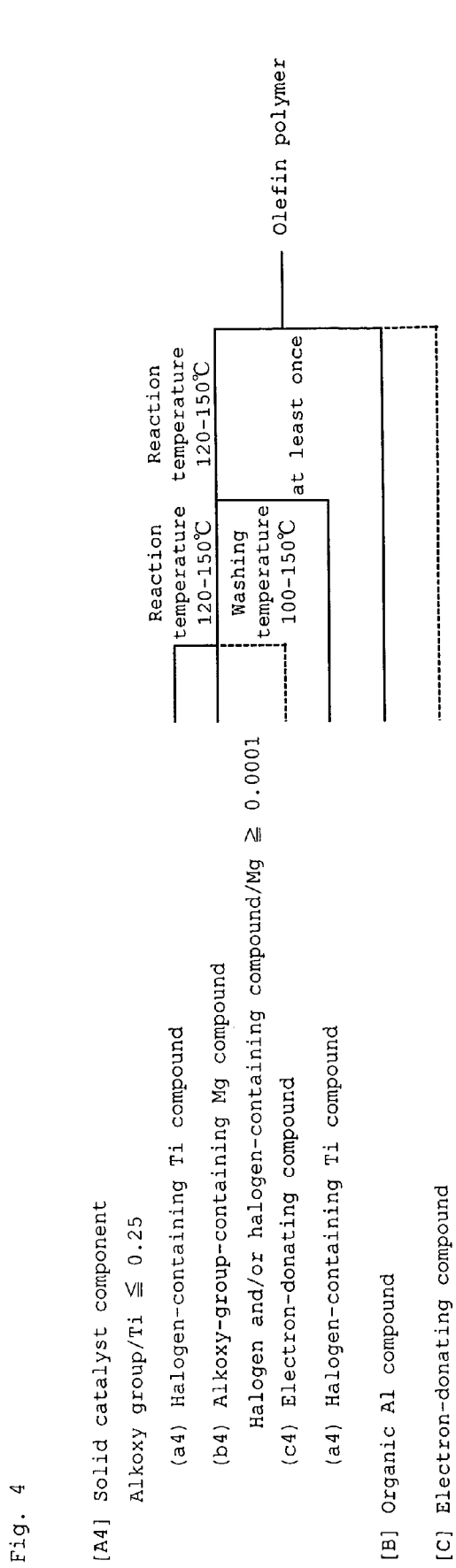
FIG. 4 is a schematic drawing for showing yet another catalyst for olefin polymerization, provided by the present invention, and a process for producing an olefin polymer.

The catalyst components, preparation methods thereof, the polymerization process, and the like in the present invention will be explained hereinafter. Embodiments shown hereinafter are preferred embodiments, and the present invention shall not be limited by them so long as it satisfies the requirements of claims.

1. Catalyst Components

[A1] Solid Catalyst Component for Olefin Polymer (a1) The oxide of at least one element that is selected from Group II to Group IV elements and which supports an alcohol-free halogen-containing magnesium compound.

The oxides of Group II to Group IV elements include solid oxides containing at least one of these elements each and solid composite inorganic oxides thereof. As Group II to Group IV elements, Mg, Ca, B, Al, Si and Sn are preferred, Al and Si are more preferred, and Si is particularly preferred.

The solid oxide includes, for example, MgO, CaO, $B_2O_3$, $SiO_2$, $SnO_2$ and $Al_2O_3$.

Further, the solid composite inorganic oxide include, for example, $SiO_2$—$Al_2O_3$, $SiO_2$—$MgO$, $SiO_2$—$TiO_2$, $SiO_2$—$V_2O_5$, $SiO_2$—$Cr2O_3$ and $SiO_2$—$TiO_2$—$MgO$.

These various solid oxides and solid composite inorganic oxides may be used alone, or two or more solid oxides or solid composite inorganic oxides of these may be simultaneously used in combination. Further, solid oxide(s) and solid composite inorganic oxide(s) of these may be simultaneously used in combination.

The above solid oxide component constitutes a basic element of a catalyst support. Therefore, when the solid oxide component is defined from the viewpoint of properties of a support, desirably, it has an average particle diameter D50 of 0.1 to 1,000 µm, particularly desirably, 5 to 100 µm, a specific surface area of 10 to 1,000 $m^2/g$, particularly desirably, 100 to 800 $m^2/g$ and a pore volume of 0.1 to 5 $cm^3/g$, particularly desirably, 1 to 2.5 $cm^3/g$. The above average particle diameter (D50) is defined to be a particle diameter corresponding to 50% of a cumulative weight percentage. That is, it shows that the total sum of weight of particles smaller than a particle diameter expressed by D50 is 50% of the total sum of weight of the entire particles.

Of the solid oxide components, $SiO_2$ that can have the above properties is particularly preferred.

The alcohol-free halogen-containing magnesium compound includes magnesium dihalides such as magnesium chloride, magnesium bromide and magnesium iodide, alkoxymagnesium halides such as butoxymagnesium chloride, cyclohexyloxymagnesium chloride, phenoxymagnesium chloride, ethoxymagnesium chloride, ethoxymagnesium bromide, butoxymagnesium bromide and ethoxymagnesium iodide, allyloxymagnesium halide, alkylmagnesium halides such as butylmagnesium chloride, cyclohexylmagnesium chloride, phenylmagnesium chloride, ethylmagnesium chloride, ethylmagnesium bromide, butylmagnesium bromide and ethylmagnesium iodide and allylmagnesium halide. Of these halogen-containing magnesium compounds, magnesium chloride is particularly preferred in view of catalyst performances.

The alcohol-free halogen-containing magnesium compound is not specially limited in composition. Desirably, in view of activity etc., the magnesium/oxide (a1) weight ratio is generally 0.1 to 20 wt %, preferably 1 to 15 wt %, particularly preferably 4 to 12 wt %.

The method of allowing the above oxide to support the alcohol-free halogen-containing magnesium compound can be selected from a method in which the solid oxide and magnesium dihalide, alkoxymagnesium halide, allyloxymagnesium halide, alkylmagnesium halide or allymagnesium halide are directly brought into contact with each other, or a method in which the solid oxide and dialkylmagnesium or dialkoxymagnesium are once brought into contact with each other and then a halogenation agent such as hydrogen chloride is brought into contact with them, to partially or completely halogenate the dialkylmagnesium or dialkoxymagnesium, and so on.

(b1) Alcohol

The alcohol is preferably selected from lower alcohols having 1 to 8 carbon atoms. It is particularly preferred to use ethanol, since a solid product that remarkably improves a catalyst in performances can be obtained. While the purity and water content of the alcohol are not critical, a catalyst is degraded in performances such as activity when an alcohol having a large water content is used. It is therefore preferred to use an alcohol having a water content of 1% or less, particularly preferably, 2,000 ppm or less. Further, for attaining better catalyst performances, the smaller the water content, the more preferred it is, and the water content is desirably 200 ppm or less.

(c1) Halogen-Containing Silicon Compound

The halogen-containing silicon compound can be selected from compounds represented by the following general formula (I).

$$Si(OR^1)_rX^1_{4-r} \qquad (I)$$

When the halogen-containing silicon compound (c1) is used, the catalyst activity during polymerization can be sometimes improved, a polymer can be sometimes improved in stereoregularity, and the content of a fine particle in a polymer can be sometimes decreased.

In the above general formula (I), $X^1$ is a halogen atom, and the halogen atom is preferably a chlorine or bromine atom, particularly preferably a chlorine atom. $R^1$ is a hydrocarbon group, and may be a saturated group or an unsaturated group. It may be linear or branched, or it may be cyclic, and it may contain a hetero atom such as sulfur, nitrogen, oxygen, silicon or phosphorus. Of these, $R^1$ is preferably a hydrocarbon group having 1 to 10 carbon atoms, particularly preferably an alkyl group, an alkenyl group, a cycloalkenyl group, an aryl group or an aralkyl group. When a plurality of groups as $OR^1$ are present, one of these may be the same as, or different from, the other or every other one. Specific examples of $R^1$ include methyl, ethyl, n-propyl, isopropyl, n-butyl, sec-butyl, isobutyl, n-pentyl, n-hexyl, n-heptyl, n-octyl, n-decyl, allyl, butenyl, cyclopentyl, cyclohexyl, cyclohexenyl, phenyl, tolyl, benzyl and phenethyl. And, r is an integer of 0 to 3.

Specific examples of the halogen-containing silicon compounds of the above general formula (I) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane and tripropoxychlorosilane. Of these, silicon tetrachloride is particularly preferred. The above halogen-containing silicon compounds may be used solely, or two or more compounds of them may be used in combination.

(d1) Electron-Donating Compound

The electron-donating compound includes oxygen-containing compounds such as alcohols, phenols, ketones, aldehydes, carboxylic acids, malonic acid, esters of organic acids or inorganic acids and ethers such as monoether, diether and polyether, and nitrogen-containing compounds such as ammonia, amine, nitrile and isocyanate. Of these, esters of polyhydric carboxylic acids are preferred, and esters of aromatic polyhydric carboxylic acids are more preferred. Of these, a monoester and/or a diester of aromatic dicarboxylic acid are/is particularly preferred in view of catalyst activity during polymerization. Further, the organic group of an ester portion is preferably a linear, branched or cyclic aliphatic hydrocarbon group.

Specific examples of the electron-donating compound include dialkyl esters such as methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl or 3-ethylpentyl dicarboxylates such as phthalate, naphthalene-1,2-dicarboxylate, naphthalene-2,3-dicarboxylate, 5,6,7,8-tetrahydronaphthalene-1,2-dicarboxylate, 5,6,7,8-tetrahydronaphthalene-2,3- dicarboxylate, indan-4,5-dicarboxylate and indan-5,6-dicarboxylate. Of these, phthalic acid diesters are preferred, and phthalic acid diesters in which the organic group of an ester portion is a linear or branched aliphatic hydrocarbon group having 4 or more carbon atoms are particularly preferred. Specific examples of these include di-n-butyl phthalate, diisobutyl phthalate, di-n-heptyl phthalate and diethyl phthalate. These compounds may be used solely, or two or more compounds of them may be used in combination.

(e) Halogen-Containing Titanium Compound

The halogen-containing titanium compound can be preferably selected from compounds represented by the following general formula (II).

$$TiX^2_p(OR^2)_{4-p} \qquad (II)$$

In the above general formula (II), $X^2$ is a halogen atom, and the halogen atom is preferably a chlorine or bromine atom, particularly preferably a chlorine atom. $R^2$ is a hydrocarbon group, and may be a saturated group or an unsaturated group. It may be linear or branched, or it may be cyclic, and it may contain a hetero atom such as sulfur, nitrogen, oxygen, silicon or phosphorus. Of these, $R^2$ is preferably a hydrocarbon group having 1 to 10 carbon atoms, particularly preferably an alkyl group, an alkenyl group, a cycloalkenyl group, an aryl group or an aralkyl group. $R^2$ is particularly preferably a linear or branched alkyl group. When a plurality of groups as $OR^2$ are present, one of these may be the same as, or different from, the other or every other one. Specific examples of $R^2$ include methyl, ethyl, n-propyl, isopropyl, n-butyl, sec-butyl, isobutyl, n-pentyl, n-hexyl, n-heptyl, n-octyl, n-decyl, allyl, butenyl, cyclopentyl, cyclohexyl, cyclohexenyl, phenyl, tolyl, benzyl and phenethyl. And, p is an integer of 1 to 4.

Specific examples of the halogen-containing titanium compounds of the above general formula (II) include titanium tetrahalides such as titanium tetrachloride, titanium tetrabromide and titanium tetraiodide; alkoxytitanium trihalides such as methoxytitanium trichloride, ethoxytitanium trichloride, propoxytitanium trichloride, n-butoxytitanium trichloride and ethoxytitanium tribromide; dialkoxytitanium dihalides such as dimethoxytitanium dichloride, diethoxytitanium dichloride, diisopropoxytitanium dichloride, di-n-propoxytitanium dichloride and diethoxytitanium dibromide; and trialkoxytitanium monohalides such as trimethoxytitanium chloride, triethoxytitanium chloride, tri-isopropoxytitanium chloride, tri-n-propoxytitanium chloride and tri-n-butoxytitanium chloride. Of these, high-halogenated titanium compounds are preferred, and titanium tetrachloride is particularly preferred, in view of polymerization activity. These halogen-containing titanium compounds may be used solely, or two or more compounds of these may be used in combination.

[A2] Solid Catalyst Component for Olefin Polymerization (a2) Oxide of at least one element selected from the Group II to Group IV elements, the oxide supporting an alkoxy-group-containing magnesium compound or an alcohol complex of a halogen-containing magnesium compound.

The oxide of at least one element selected from the Group II to Group IV elements and the halogen-containing magnesium compound are as explained with regard to the above oxide (a1), so that their explanations are omitted.

The alkoxy-group-containing magnesium compound includes dialkoxymagnesium compounds such as dimethoxymagnesium, diethoxymagnesium, dipropoxymagnesium, dibutoxymagnesium, dihexyloxymagnesium, dioctoxymagnesium, diphenoxymagnesium and dicyclohexyloxymagnesium, diallyloxymagnesium; alkoxyalkylmagnesium compounds such as ethoxyethylmagnesium, phenoxymethylmagnesium, ethoxyphenylmagnesium, cyclohexyloxyphenylmagnesium, allyloxyalkylmagnesiu, alkoxyallylmagnesium, allyloxyallylmagnesium; alkoxymagnesium halides such as butoxymagnesium chloride, cyclohexyloxymagnesium chloride, phenoxymagnesium chloride, ethoxymagnesium chloride, ethoxymagnesium bromide, butoxymagnesium bromide and ethoxymagnesium iodide, and allyloxymagnesium halides. Of these alkoxy-group-containing magnesium compounds, dialkoxymagnesium compounds are preferred, and diethoxymagnesium is particularly preferred, in view of catalyst performances.

The alcohol is preferably selected from lower alcohols having 1 to 8 carbon atoms, such as methanol, ethanol, propanol, butanol, and the like. Of these, ethanol is particularly preferred.

While the alkoxy-group-containing magnesium compound or the alcohol complex of the halogen-containing magnesium compound is not specially limited concerning its composition, the magnesium/oxide (a2) weight ratio is generally 0.1 to 20 wt %, preferably 1 to 15 wt %, particularly preferably 2 to 12 wt %, in view of activity, and the like.

The method of allowing the above oxide to support the alkoxy-group-containing magnesium compound can be selected from a method in which the solid oxide and the dialkoxymagnesium, diallyloxymagnesium, alkoxyalkylmagnesium, allyloxyalkylmagnesium, alkoxymagnesium halide or allyloxymagnesium halide are directly brought into contact with each other, or a method in which the solid oxide and the dialkylmagnesium are once brought into contact with each other and then an alcohol is brought into contact to partially or completely alkoxylate the dialkylmagnesium The method of allowing the above oxide to support the alcohol complex of the halogen-containing magnesium compound can be selected from a method in which the solid oxide and the alcohol complex of the magnesium dihalide, the alcohol complex of the alkoxymagnesium halide or the alcohol complex of the allyloxymagnesium halide are directly brought into contact with each other or a method in which the solid oxide and the magnesium dihalide, alkoxymagnesium halide or allyloxymagnesium halide are once brought into contact with each other and then the alcohol is brought into contact to form the corresponding alcohol complex.

(b2) Halogen-Containing Silicon Compound

The halogen-containing silicon compound (b2) is as explained with regard to the halogen-containing silicon compound (c1) for use in the solid catalyst component [A1], so that its explanation is omitted.

(c2) Electron-Donating Compound

The electron-donating compound (c2) is as explained with regard to the electron-donating compound (d1) for use in the solid catalyst component [A1], so that its explanation is omitted.

(d2) Halogen-Containing Titanium Compound

The halogen-containing titanium compound (d2) is as explained with regard to the halogen-containing titanium compound (e) for use in the solid catalyst component [A1], so that its explanation is omitted.

[A3] Solid Catalyst Component for Olefin Polymerization (a3) Halogen-Containing Titanium Compound The halogen-containing titanium compound (a3) is as explained with regard to the halogen-containing titanium compound (e) for use in the solid catalyst component [A1], so that its explanation is omitted.

(b3) Alkoxy-Group-Containing Magnesium Compound

The alkoxy-group-containing magnesium compound can be preferably selected from compounds represented by the following general formula (III).

$$Mg(OR^3)_qR^4_{2-q} \quad \quad (III)$$

In the above general formula (III), $R^3$ is a hydrocarbon group, and $R^4$ is a hydrocarbon group or a halogen atom. Each of the hydrocarbon group represented by $R^3$ and the hydrocarbon group represented by $R^4$ includes an alkyl group having 1 to 12 carbon atoms, a cycloalkyl group, an aryl group and an aralkyl group, and these hydrocarbon groups may be the same as, or different from, each other. The halogen atom represented by $R^4$ includes chlorine, bromine, iodine and fluorine. And, q is an integer of 1 to 2.

Specific examples of the alkoxy-group-containing magnesium compounds of the above general formula (III) include dialkoxymagnesium compounds such as dimethoxymagnesium, diethoxymagnesium, dipropoxymagnesium, dibutoxymagnesium, dihexyloxymagnesium, dioctoxymagnesium, diphenoxymagnesium, dicyclohexyloxymagnesium, diallyloxymagnesium; alkoxyalkylmagnesium compounds such as ethoxyethylmagnesium, phenoxymethylmagnesium ethoxyphenylmagnesium and cyclohexyloxyphenylmagnesium, allyloxyalkylmagnesium, alkoxyallylmagnesium, allyloxyallylmagnesium; alkoxymagnesium halides such as butoxymagnesium chloride, cyclohexyloxymagnesium chloride, phenoxymagnesium chloride, ethoxymagnesium chloride, ethoxymagnesium bromide, butoxymagnesium bromide and ethoxymagnesium iodide, and allyloxymagnesium halide.

Of these, dialkoxymagnesium compounds are preferred, and diethoxymagnesium is particularly preferred, in view of polymerization activity and stereoregularity.

In view of the polymerization activity of the catalyst and the powder form and stereoregularity of an olefin polymer, preferably, the alkoxy-group-containing magnesium compound (b3) is obtained by reacting metal magnesium, an alcohol and a halogen or halogen-containing compound containing 0.0001 gram atom, per mole of the metal magnesium, of a halogen.

The above metal magnesium is not critical with regard to its form, and the like. Therefore, a metal magnesium having any particle diameter, for example, a metal magnesium having a granular, ribbon-shaped or powdery form, may be used. While the surface state of the metal magnesium is not critical, either, a metal magnesium having a surface free of a coating of magnesium hydroxide, or the like is preferred.

The alcohol is preferably selected from lower alcohols having 1 to 6 carbon atoms. Ethanol is particularly preferred, since ethanol serves to give a solid product that remarkably improves the exhibition of catalytic performances. While the purity and water content of the alcohol are not critical, either. When an alcohol having a large water content is used, however, magnesium hydroxide is formed on the metal magnesium surface, so that it is preferred to use an alcohol having a water content of 1% or less, and it is particularly preferred to use an alcohol having a water content of 2,000 ppm or less. Further, for attaining better morphology, a smaller water content is preferred, and the water content is generally desirably 200 ppm or less.

The halogen is selected from chlorine, bromine or iodine, and iodine is particularly suitably used.

Further, the halogen atom of the halogen-containing compound is preferably chlorine, bromine or iodine. The halogen-containing compound is particularly preferably a halogen-containing metal compound. Specifically, the halogen-containing compound can be preferably selected from $MgCl_2$, $MgI_2$, $Mg(OEt)Cl$, $Mg(OEt)I$, $MgBr_2$, $CaCl_2$, $NaCl$ or $KBr$ etc. Of these, $MgCl_2$ is particularly preferred. The state, form and particle size of these compounds are not limited, and a compound being in any state and having any form and any particle size can be used. For example, a solution of such a compound in an alcohol solvent (e.g., ethanol) can be used.

The amount of the alcohol per mole of the metal magnesium is preferably 2 to 100 mol, particularly preferably 5 to 50 mol. When the amount of the alcohol is too large, the yield of the alkoxy-group-containing magnesium compound (b3) having excellent morphology may decrease in some cases. When it is too small, stirring in a reaction vessel may not smoothly proceed in some cases, while it is not limited by the molar ratio.

The amount of the halogen as a halogen atom per mole of the metal magnesium is 0.0001 gram atom or more, preferably 0.0005 gram atom or more, more preferably 0.001 gram atom or more. When the amount of the halogen is less than 0.0001 gram atom, there is no difference from a case where no halogen is used as a reaction initiator, and when the thus-obtained alkoxy-group-containing magnesium compound (b3) is used as a catalyst support, the catalyst may be poor in catalyst activity or an olefin polymer may be defective in morphology, and the like.

The amount of the halogen-containing compound, as a halogen atom in the halogen-containing compound per mole of the metal magnesium, is at least 0.0001 gram atom or more, preferably 0.0005 gram atom or more, more preferably 0.001 gram atom or more. When the above amount is less than 0.0001 gram atom, there is no difference from a case where no halogen-containing compound is used as a reaction initiator, and when the thus-obtained alkoxy-group-containing magnesium compound (b3) is used as a catalyst support, the catalyst may be poor in catalyst activity, or an olefin polymer may be defective in morphology, and the like.

In the present invention, the halogens or the halogen-containing compounds may be used solely each, and two or more halogens or halogen-containing compounds of these may be used in combination. Further, the halogen and the halogen-containing compound may be used in combination. When the halogen and the halogen-containing compound are used in combination, the amount of total halogen atoms in the halogen and the halogen-containing compound per mole of the metal magnesium is 0.0001 gram atom or more, preferably 0.0005 gram atom or more, more preferably 0.001 gram atom or more.

While the upper limit of the amount(s) of the halogen and/or the halogen-containing compound is not specially limited, the upper limit may be set as required so long as the alkoxy-group-containing magnesium compound (b3) for use in the present invention can be obtained. Generally, the above upper limit is preferably less than 0.06 gram atom.

In the process for the production of an olefin polymer, provided by the present invention, the amount of the halogen and/or the halogen-containing compound is determined as required, whereby the particle diameter of the alkoxy-group-containing magnesium compound (b3) can be controlled as required.

The preparation of the alkoxy-group-containing magnesium compound (b3) is carried out until the generation of hydrogen gas is no longer observed (generally, for 1 to 30 hours). Specifically, when iodine is used as a halogen, the alkoxy-group-containing magnesium compound (b3) can be prepared by a method in which iodine in the form of a solid is charged into the metal magnesium and the alcohol and then the mixture is allowed to react under heat, a method in which a solution of iodine in an alcohol is dropwise added to the metal magnesium and the alcohol and the mixture is allowed to react under heat, or a method in which, while the metal magnesium and an alcohol solution are heated, a solution of iodine in an alcohol is dropwise added to allow the mixture to react.

Each method is preferably carried out in the atmosphere of an inert gas (e.g., nitrogen gas or argon gas) and optionally in the presence of an inert organic solvent (e.g., saturated hydrocarbon such as n-hexane).

Further, it is not required to charge the entire amount of each of the metal magnesium, the alcohol and the halogen at once from the beginning, and they may be divided and partially charged. In a particularly preferred embodiment, the alcohol is entirely charged in the beginning, the metal magnesium is divided into several portions and such portions are charged separately. In this embodiment, the generation of a large amount of hydrogen gas can be prevented, which is desirable in view of safety. Further, the size of a reaction vessel can be decreased. Further, it is also made possible to prevent the dissipation of alcohol and halogen caused by the momentary generation of a large amount of hydrogen gas. While the number of the divisional portions can be determined by taking account of the size of the reaction vessel and is not specially limited, suitably, each is generally divided into five to ten portions in view of complicatedness of procedures.

Further, the reaction may be carried out by any one of a batch method and a continuous method. Further, there may be employed a variant method in which the entire amount of the alcohol is charged in the beginning, a small amount of the metal magnesium is added to the alcohol, a product formed by a reaction is removed by separating it into other vessel, then, a small amount of the metal magnesium is charged, and these procedures are repeated.

Further, in view of the catalyst activity during polymerization and the powder form of an olefin polymer, the metal magnesium, the alcohol and the halogen and/or the halogen-containing compound are allowed to react at 30 to 60° C., more preferably at 40 to 55° C., thereby to adjust the average particle diameter (D50) of the thus-obtained alkoxy-group-containing magnesium compound (b3) to 50 μm or less, more preferably 40 μm or less. The average particle diameter (D50) is preferably 1 μm or more.

The average particle diameter (D50) is defined to be a particle diameter corresponding to 50% of a cumulative weight percentage. That is, it shows that the total sum of weight of particles having a smaller diameter than the particle diameter expressed by D50 is 50% of the total weight of the entire particles.

When the reaction temperature is adjusted to 30 to 60° C., the compound (b3) decreases in particle diameter while retaining the properties that it is spherical and has a narrow particle size distribution, the halogenation of the compound (b3) proceeds, and the amount of a residual alkoxy group content in the solid catalyst component can be decreased. When the reaction temperature is higher than the above temperature range, the decrease in particle diameter does not efficiently proceed. When it is lower than the above temperature range, the rate of formation of the compound (b3) greatly decreases, which results in a decrease in productivity.

When the average particle diameter (D50) is decreased to a smaller diameter of as small as 50 μm or less, presumably, the compound (b3) is improved in halogenation degree, and an alkoxytitanium compound and the like, which are predictably formed as a byproduct, come to be easily extracted from the solid surface.

When the alkoxy-group-containing magnesium compound (b3) is used for the preparation of the solid catalyst component [A3], a dry product may be used, or a product obtained by washing a filtered product with heptane, or the like, may be used. In any case, the alkoxy-group-containing magnesium compound (b3) can be used in a step to follow, without any pulverization or any sieving procedure for attaining a uniform particle diameter distribution. Further, the alkoxy-group-containing magnesium compound (b3) is nearly spherical and has a sharp particle diameter distribution. Furthermore, the alkoxy-group-containing magnesium compound (b3) as individual particles has a small variability of sphericity.

These alkoxy-group-containing magnesium compounds (b3) may be used solely, or two or more of them may be used in combination. Further, the alkoxy-group-containing magnesium compound (b3) may be used in a state where it is supported on a support such as silica, alumina or polystyrene, or it may be used in the form of a mixture with a halogen and the like.

(c3) Halogen-Containing Silicon Compound

The halogen-containing silicon compound (c3) is similar to the halogen-containing silicon compound (c1) for use in the solid catalyst component [A1], so that a duplicate explanation will be omitted.

The halogen-containing silicon compound (c3) is particularly preferably silicon tetrachloride.

Presumably, the use of silicon tetrachloride can fully control the reaction rate of the halogenation, and the conversion, of the compound (b3) with silicon tetrachloride.

Further, the compound (c3) is preferably a halogen-containing silicon compound (c3-1) in which the molar ratio of a halogen to the alkoxy group of the compound (b3) is 0.50 or more. When such a halogen-containing silicon compound is used, the halogenation of the compound (b3) proceeds, and the amount of residual alkoxy groups in the solid catalyst component can be decreased. More preferably, the compound (c3) is a halogen-containing silicon compound in which the molar ratio of a halogen to the alkoxy group of the compound (b3) is 0.80 or more.

(d3) Electron-Donating Compound

The electron-donating compound (d3) for optional use in the preparation of the solid catalyst component [A3] is as explained with regard to the electron-donating compound (d1) for use in the solid catalyst component [A1], so that its explanation is omitted.

[A4] Solid Catalyst Component for Olefin Polymerization (a4) Halogen-Containing Titanium Compound The halogen-containing titanium compound (a4) is as explained with regard to the halogen-containing titanium compound (e) for use in the solid catalyst component [A1], so that its explanation is omitted.

(b4) Alkoxy-Group-Containing Magnesium Compound

The alkoxy-group-containing magnesium compound (b4) is as explained with regard to the alkoxy-group-containing magnesium compound (b3) for use in the solid catalyst component [A3], so that its explanation is omitted.

(c4) Electron-Donating Compound

The electron-donating compound (c4) for optional use in the preparation of the solid catalyst component [A4] is as explained with regard to the electron-donating compound (d1) for use in the solid catalyst component [A1], so that its explanation is omitted.

[B] Organic Aluminum Compound

Although not specially limited, the organic aluminum compound [B] can be preferably selected from an organic aluminum compound having an alkyl group, a halogen atom, a hydrogen atom and an alkoxy group, aluminoxane, or a mixture of these. Specific examples thereof include trialkylaluminum compounds such as trimethylaluminum, triethylaluminum, triisopropylaluminum, triisobutylaluminum and trioctylaluminum; dialkylaluminum monochlorides such as diethylaluminum monochloride, diisopropylaluminum monochloride, diisobutylaluminum monochloride and dioctylaluminum monochloride; alkylaluminum sesquihalides such as ethylaluminum sesquichloride; and linear aluminoxanes such as methylaluminoxane. Of these organic aluminum compounds, trialkylaluminum having a lower alkyl group having 1 to 5 carbon atoms is preferred, and trimethylaluminum, triethylaluminum, tripropylaluminum and triisobutylaluminum are particularly preferred. These organic aluminum compounds may be used solely, or two or more compounds of these may be used in combination.

[C] Electron-Donating Compound

In the present invention of the catalyst for olefin polymerization, provided by the present invention, the electron-donating compound [C] is used as required. The electron-donating compound [C] can be selected from an organosilicon compound having an alkoxy group, a nitrogen-containing compound, a phosphorus-containing compound or an oxygen-containing compound. Of these, it is particularly preferred to use an organosilicon compound having an alkoxy group.

Specific examples of the organosilicon compound having an alkoxy group include trimethylmethoxysilane, trimethylethoxysilane, triethylmethoxysilane, triethylethoxysilane, dimethyldimethoxysilane, dimethyldiethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl)dimethoxysilane, t-butylamyldimethoxysilane, t-butylhexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluromethylpropyl)dimethoxysilane, cyclohexylmethyldimethoxysilane, cyclohexylethyldimethoxysilane, cyclohexylpropyldimethoxysilane, cyclohexylisobutyldimethoxysilane, dicyclohexyldimethoxysilane, cyclohexyl-t-butyldimethoxysilane, cyclopentylmethyldimethoxysilane, cyclopentylethyldimethoxysilane, cyclopentylpropyldimethoxysilane, cyclopentyl-t-butyldimethoxysilane, dicyclopentyldimethoxysilane, cyclopentylcyclohexyldimethoxysilane, bis(2-methylcyclopentyl)dimethoxysilane, bis(2,3-dimethylcyclopentyl)dimethoxysilane, α-naphthyl-1,1,2-trimethylpropyldimethoxysilane, n-tetradecanyl-1,1,2-trimethylpropyldimethoxysilane, 1,1,2-trimethylpropylmethyldimethoxysilane, 1,1,2-trimethylpropylethyldimethoxysilane, 1,1,2-trimethylpropylisopropyldimethoxysilane, 1,1,2-trimethylpropylcyclopentyldimethoxysilane, 1,1,2-trimethylpropylcyclohexyldimethoxysilane, 1,1,2-trimethylpropylmyristyldimethoxysilane, diphenyldimethoxysilane, diphenyldiethoxysilane, phenyltriethoxysilane, methyltrimethoxysilane, methyltriethoxysilane, ethyltrimethoxysilane, ethyltriethoxysilane, propyltrimethoxysilane, isopropyltrimethoxysilane, butyltrimethoxysilane, butyltriethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyl trimethoxysilane, norbornenetrimethoxysilane, indenyl trimethoxysilane, 2-methylcyclopentyl trimethoxysilane, ethyltriisopropoxysilane, methylcyclopentyl(t-butoxy)dimethoxysilane, isopropyl(t-butoxy)dimethoxysilane, t-butyl(t-butoxy)dimethoxysilane, (isobutoxy)dimethoxysilane, vinyltriethoxysialen, vinyltributoxysilane, chlorotriethoxysilane, γ-chloropropyltrimethoxysilane, γ-aminopropyltriethoxysilane, 1,1,2-trimethylpropyltrimethoxysilane, 1,1,2-trimethylpropylisopropoxydimethoxysilane, 1,1,2-trimethylpropyl (t-butoxy)dimethoxysilane, tetramethoxysilane, tetraethoxysilane, tetrabutoxysilane, tetraisobutoxysilane, ethyl silicate, butyl silicate, trimethylphenoxysilane, methyltriallyloxysilane, vinyltris (β-methoxyethoxy)silane, vinyltrisacetoxysilane and dimethyltetraethoxydisiloxane. These organosilicon compounds may be used solely, or two or more compounds of these may be used in combination.

Further, the above organosilicon compound also includes a compound obtained by reacting a silicon compound having no Si—O—C bond with an organic compound having an O—C bond in advance or by reacting these compounds during the polymerization of an α-olefin. Specifically, a compound obtained by reacting silicon tetrachloride and an alcohol is included.

Specific examples of the nitrogen-containing compound include 2,6-substituted piperidines such as 2,6-diisopropylpiperidine, 2,6-diisopropyl-4-methylpiperidine and N-methyl-2,2,6,6-tetramethylpiperidine; 2,5-substituted azolidines such as 2,5-diisopropylazolidine and N-methyl-2,2,5,5-tetramethylazolidine; substituted methylenediamines such as N,N,N',N'-tetramethylmethylenediamine and N,N,N',N'-tetraethylmethylenediamine; and substituted imidazolidines such as 1,3-dibenzylimidazolidine and 1,3-dibenzyl-2-phenylimidazolidine.

Specific examples of the phosphorus-containing compound include phosphorous acid esters such as triethyl phosphite, tri-n-propyl phosphite, triisopropyl phosphite, tri-n-butyl phosphite, triisobutyl phosphite, diethyl-n-butyl phosphite and diethylphenyl phosphite.

Specific examples of the oxygen-containing compound include 2,5-substituted tetrahydrofurans such as 2,2,5,5-tetramethyltetrahydrofuran and 2,2,5,5-tetraethyltetrahydrofuran; and dimethoxymethane derivatives such as 1,1-dimethoxy-2,3,4,5-tetrachlorocyclopentadiene, 9,9-dimethoxyfluorene and diphenyldimethoxymethane.

2. Method of Preparation of Solid Catalyst Component

Method of Preparing Solid Catalyst Component [A1]

The method of preparing the solid catalyst component [A1] can be a method in which the oxide (a1) of at least one element of Groups II to IV elements, the oxide (a1) supporting the above alcohol-free halogen-containing magnesium compound, and a predetermined amount of the alcohol (b1) are brought into contact, and reacted, with each other, then, the reaction mixture is brought into contact, and reacted, with a predetermined amount of the halogen-containing silicon compound (c1), the reaction mixture is reacted with the electron-donating compound (d1) and the halogen-containing titanium compound (e) at a temperature of 120° C. or higher but 150° C. or lower, and the reaction product is washed with an inert solvent, and then is brought into contact, and allowed to react, with the halogen-containing titanium compound (e) again (at least once) at a temperature of 120° C. or higher but 150° C. or lower. The order of other contacts is not critical.

Preferably, the halogen-containing titanium compound (e) is brought into contact with a reaction mixture obtained by bringing the compounds (a1) to (c1) into contact with one another, and then the electron-donating compound (d1) is brought into contact with the reaction mixture, since the solid catalyst component in this case can be sometimes improved in polymerization activity.

Further, these components may be brought into contact in the presence of an inert solvent such as a hydrocarbon, or each component may be diluted with an inert solvent such as a hydrocarbon before they are brought into contact. Examples of the above inert solvent include aliphatic or alicyclic hydrocarbons such as octane, decane and ethylcyclohexane, aromatic hydrocarbons such as toluene, ethylbenzene and xylene, halogenated hydrocarbons such as chlorobenzene, tetrachloroethane and chlorofluorocarbon, and mixtures of these. Of these, an aliphatic hydrocarbon and aromatic hydrocarbon are preferred, and an aliphatic hydrocarbon is particularly preferred.

The amount of the above halogen-containing titanium compound (e) per mole of magnesium of the above halogen-containing magnesium compound is generally 0.5 to 100 mol, preferably 1 to 50 mol. When the above molar ratio is outside the above range, the catalyst activity is sometimes insufficient.

Further, the amount of the electron-donating compound (d1) per mole of the above halogen-containing magnesium compound is generally 0.01 to 10 mol, preferably 0.05 to 1.0 mol. When the above molar ratio is outside the above range, the catalyst activity is sometimes insufficient or an olefin polymer sometimes has insufficient stereoregularity.

The halogen-containing silicon compound (c1) is used in such an amount that the molar ratio of the halogen to the magnesium of the above halogen-containing magnesium compound is 0.20 or more, preferably from 0.4 to 4.0, more preferably from 1.0 to 2.5. When the above amount is smaller than the above range, the catalyst activity or the effect on improvement in stereoregularity is not fully exhibited, and a formed polymer is caused to have an increased amount of a fine powder and is caused to have a decreased bulk density. When the above amount is too large, there is produced no further effect on these improvements.

The alcohol (b1) is used in such an amount that the molar ratio of the hydroxy group to the magnesium of the above halogen-containing magnesium compound is 1 or more, preferably from 2 to 5, more preferably from 2.5 to 4. When the above amount is smaller than the above range, the catalyst activity or the effect on improvement in stereoregularity is not fully exhibited. When it is too large, there is not any further effect on these improvements.

After the above compounds (a1) to (e) are all added, they are brought into contact and allowed to react preferably in a temperature range of 120 to 150° C., particularly preferably 125 to 140° C. When the above contact temperature is outside the above range, the catalyst activity or the effect on improvement in stereoregularity is sometimes not fully exhibited. Further, the above contact is carried out generally for 1 minute to 24 hours, preferably 10 minutes to 6 hours. Differing depending upon a type of a solvent when it is used and a contact temperature, etc., the pressure for the contact is generally in the range of atmospheric pressure to 5 MPa, preferably atmospheric pressure to 1 MPa. During the contacting procedures, preferably, they are stirred in view of the uniformity and efficiency of the contact. These contact conditions are also applicable to the contact reaction that is carried out for the second time or more with regard to the halogen-containing titanium compound (e).

When a solvent is used in the contact procedure of the halogen-containing titanium compound (e), the amount of the solvent per mole of the halogen-containing titanium compound (e) is generally 5,000 milliliters or less, preferably 10 to 1,000 milliliters. When the above ratio is outside the above range, the uniformity or efficiency of the contact may be sometimes degraded.

Further, it is sometimes desirable to wash a reaction product, which is from the first contact reaction of the halogen-containing titanium compound (e), with an inert solvent at a temperature of 100 to 150° C., particularly preferably 120 to 140° C. When the above washing temperature is outside the above range, the catalyst activity or the effect on improvement in stereoregularity is sometimes not exhibited. The inert solvent can be selected from the already explained solvents.

With regard to the washing temperature after the contact reaction which is carried out for the second time or more with the halogen-containing titanium compound (e), the washing is preferably carried out with an inert solvent at a temperature of 100 to 150° C., particularly preferably 120 to 140° C., in view of stereoregularity.

The washing method is preferably selected from a decantation or filtering method. Although the amount of the inert solvent, the washing time period and the number of times of the washing are not critical, the washing is carried out generally with a solvent in an amount, per mole of the magnesium compound, of 100 to 100,000 milliliters, preferably 500 to 50,000 milliliters, generally for 1 minute to 24 hours, preferably 10 minutes to 6 hours. When the above ratio is outside the above range, the washing may be incomplete.

While the pressure in the above case differs depending upon the type of the solvent, the washing temperature, and the like, the pressure is generally in the range of atmospheric pressure to 5 MPa, preferably atmospheric pressure to 1 MPa. For the uniformity of the washing and the washing efficiency, it is preferred to stir the reaction mixture during the washing. The thus-obtained solid catalyst component can be stored in a dry state or in an inert solvent such as a hydrocarbon.

In the above-obtained solid catalyst component [A1], preferably, the molar ratio (RO/Ti) of the residual alkoxy group (RO) to the supported titanium (Ti) is 0.60 or less. That is because when the molar ratio exceeds 0.60, no intended catalyst may be obtained.

Further, the above molar ratio is more preferably 0.45 or less, still more preferably 0.35 or less.

Further, the residual alkoxy group content (RO) is preferably 0.40 mmol/g or less. The reason therefore is that when the residual alkoxy group content exceeds 0.40 mmol/g, the catalyst is poor in activity, the catalyst cost increases and the amount of catalyst residues such as Cl, etc., in a powder increases, so that a product quality may be sometimes degraded.

Further, the residual alkoxy group content is more preferably 0.25 mmol/g, still more preferably 0.15 mmol/g.

When the catalyst is prepared under the specific reaction conditions, the residual alkoxy group content can be controlled. In this case, the order of contacting the chemicals, the amount of the compound (c1) and the reaction temperature of the compound (e) are essential.

The amount of the supported titanium is preferably 1.0% by weight or mores The reason therefor is that when the amount of the supported titanium is less than 1.0% by weight, the activity per the catalyst is sometimes decreased even if the activity per titanium is high (even if the RO/Ti is low).

Further, the amount of the supported titanium is more preferably 1.2% by weight or more, still more preferably 1.5% by weight or more.

The amount of the supported titanium can be controlled when the component (a1) having the specific composition is selected or when the catalyst is prepared under the specific reaction conditions. In this case, with regard to the component (a1), the composition of the oxide and the content of the magnesium compound are considered to be essential. With regard to the reaction conditions, the reaction temperature of the compound (e) and the washing temperature after the reaction of the compound (e) are essential.

Method of Preparing Solid Catalyst Component [A2]

The method of the solid catalyst component [A2] can be a method in which the oxide (a2) of at least one element of the Groups II to IV elements, the oxide supporting the above alkoxy-group-containing magnesium compound or the alcohol complex of the halogen-containing magnesium compound, and the predetermined amount of the halogen-containing silicon compound (b2) are brought into contact, and reacted, with each other, the reaction mixture is brought into contact, and reacted, with the electron-donating compound (c2) and the halogen-containing titanium compound (d2) at a temperature of 120° C. or higher but 150° C. or lower, the reaction mixture is washed with an inert solvent, and the halogen-containing titanium compound (d2) is reacted with the reaction product again (at least once) at a temperature of 120° C. or higher but 150° C. or lower. The order of other contacts is not critical.

Preferably, the halogen-containing titanium compound (d2) is brought into contact with a reaction mixture obtained by bringing the compound (a2) and the halogen-containing silicon compound (b2) into contact with each other, and then the electron-donating compound (c2) is brought into contact with the reaction mixture, since the solid catalyst component in this case can be sometimes improved in polymerization activity.

Further, these components may be brought into contact in the presence of an inert solvent such as a hydrocarbon, or each component may be diluted with an inert solvent such as a hydrocarbon before they are brought into contact. The inert solvent can be selected from those explained with regard to the preparation of the solid catalyst component [A1].

The amount of the above halogen-containing titanium compound (d2) per mole of magnesium of the above alkoxy-group-containing magnesium compound or the alcohol complex of the halogen-containing magnesium compound is generally 0.5 to 100 mol, preferably 1 to 50 mol. When the above molar ratio is outside the above range, the catalyst activity is sometimes insufficient.

Further, the amount of the electron-donating compound (c2) per mole of magnesium of the above alkoxy-group-containing magnesium compound or the alcohol complex of the halogen-containing magnesium compound is generally 0.01 to 10 mol, preferably 0.05 to 1.0 mol. When the above molar ratio is outside the above range, the catalyst activity is sometimes insufficient or an olefin polymer sometimes has insufficient stereoregularity.

The halogen-containing silicon compound (b2) is used in such an amount that the molar ratio of the halogen to the magnesium of the alkoxy-group-containing magnesium compound or the alcohol complex of the halogen-containing magnesium compound is generally 0.20 or more, preferably from 0.4 to 4.0, more preferably from 1.0 to 2.5. When the above amount is much smaller than the above range, the catalyst activity or the effect on improvement in stereoregularity is not fully exhibited, and a formed polymer is caused to have an increased amount of a fine powder and a decreased bulk density. When it is too large, there is produced no further effect on these improvements.

After the above compounds (a2) to (d2) are all added, they are brought into contact and allowed to react preferably in a temperature range of 120 to 150° C., particularly preferably 125 to 140° C. When the above contact temperature is outside the above range, the catalyst activity or the effect on improvement in stereoregularity is sometimes not fully exhibited. The contact time period, the pressure during the contacting and the stirring during the contacting procedures are as explained with regard to the solid catalyst component [A1]. These contact conditions are also applicable to the contact reaction that is carried out for the second time or more with the halogen-containing titanium compound (d2).

When a solvent is used in the contact procedures of the halogen-containing titanium compound (d2), the amount of the solvent per mole of the halogen-containing titanium compound (d2) is generally 5,000 milliliters or less, preferably 10 to 1,000 milliliters. When the above ratio is outside the above range, the uniformity of the contact or the contact efficiency is sometimes degraded.

Further, after the first contact reaction of the halogen-containing titanium compound (d2), it is sometimes desirable to wash the reaction mixture with an inert solvent at a temperature of 100 to 150° C., particularly preferably 120 to 140° C. When the above washing temperature is outside the above range, the catalyst activity or the effect on improvement in stereoregularity is sometimes not fully exhibited. The inert solvent can be selected from those explained in the preparation of the solid catalyst component [A1].

After the contact reaction that is carried out for the second time and thereafter with the halogen-containing titanium compound (d2), the washing temperature, the washing method, the amount of the inert solvent, the washing time period, the number of times of the washing, the washing pressure and the stirring during the washing procedure are as explained with regard to the preparation of the solid catalyst component [A1]. The thus-obtained solid catalyst component [A2] can be stored in a dry state or in an inert solvent such as a hydrocarbon.

In the above-obtained solid catalyst component [A2], the molar ratio (RO/Ti) of the residual alkoxy group content (RO) to the supported titanium (Ti) is preferably 0.70 or less. That is because when the molar ratio exceeds 0.70, no intended catalyst may be obtained.

Further, the above molar ratio is preferably 0.50 or less, more preferably 0.45 or less.

Further, the residual alkoxy group content (RO) is preferably 0.50 mmol/g or less. The reason therefor is that when the residual alkoxy group content exceeds 0.50 mmol/g, the catalyst activity is low, the catalyst cost increases, and the amount of catalyst residues such as Cl, etc., in a powder increases, so that a product quality is sometimes degraded.

Further, the residual alkoxy group content is more preferably 0.35 mmol/g or less, still more preferably 0.20 mmol/g or less.

When the catalyst is prepared under the specific conditions, the residual alkoxy group content can be controlled. In this case, particularly, the contact order of the compounds (a2) to (d2), the amount of the compound (b2) and the reaction temperature of the compound (d2) are essential.

Further, the amount of the supported titanium is preferably 1.0% by weight or more. The reason therefor is that when the amount of the supported titanium is less than 1.0% by weight, the activity per the catalyst is sometimes low even if the activity per titanium is high (even if the RO/Ti is low).

Further, the amount of the supported titanium is more preferably 1.2% by weight or more, still more preferably 1.5% by weight or more.

The amount of the supported titanium can be controlled when the component (a2) having the specific composition is selected or when the catalyst is prepared under the specific reaction conditions. In this case, with regard to the component (a2), the composition of the oxide, the content of the magnesium compound and the like are considered to be essential. With regard to the reaction conditions, the reaction temperature of the compound (d2) and the washing temperature after the reaction of the compound (d2) are essential.

Method of Preparing Solid Catalyst Component [A3]

In the method of preparing the solid catalyst component [A3], the above halogen-containing titanium compound (a3), the alkoxy-group-containing magnesium compound (b3), the halogen-containing silicon compound (c3) and optionally the electron-donating compound (d3) are allowed to react.

The method of preparing the solid catalyst component [A3] is preferably a method in which the above halogen-containing titanium compound (a3), the alkoxy-group-containing magnesium compound (b3), the halogen-containing silicon compound (c3) and optionally the electron-donating compound (d3) are allowed to react at a temperature of 120° C. or higher but 150° C. or lower, the reaction mixture is washed with an inert solvent, the halogen-containing titanium compound (a3) is further reacted with the reaction product at least once at a temperature of 120° C. or higher but 150° C. or lower, and the reaction product is washed with an inert solvent. In this case, the compound (c3) is a halogen-containing silicon compound (c3-1) in which the molar ratio of halogen to the alkoxy group in the compound (b3) is 0.50 or more.

As described above, the compounds (a3) to (c3) or the compounds (a3) to (d3) are allowed to react at the specific temperature and then the halogen-containing titanium compound (a3) is reacted with the reaction mixture again (at least once) at the specific temperature, whereby a polymer activity may be improved.

Other contact orders are not critical. For example, the above components may be allowed to react in the presence of an inert solvent such as a hydrocarbon, or each component may be diluted with an inert solvent such as a hydrocarbon beforehand. The inert solvent can be selected from those inert solvents explained with regard to the preparation of the solid catalyst component [A1].

While the order of contact of the compounds (a3) to (c3) or the compounds (a3) to (d3) is not specially limited, preferably, the alkoxy-group-containing magnesium compound (b3) and the halogen-containing silicon compound (c3) are first brought into contact with each other, then, the halogen-containing titanium compound (a3) is brought into contact, the electron-donating compound (d3) is finally brought into contact, and the halogen-containing titanium compound (a3) is further brought into contact, since the polymerization activity in this case can be improved.

The amount of the halogen-containing titanium compound (a3) per mole of magnesium of the alkoxy-group-containing magnesium compound (b3) is generally 0.5 to 100 mol, preferably 1 to 50 mol. When the above molar ratio is outside the above range, the catalyst activity may be sometimes insufficient.

The amount of the electron-donating compound (d3) per mole of magnesium of the alkoxy-group-containing magnesium compound (b3) is generally 0.01 to 10 mol, preferably 0.05 to 1.0 mol. When the above molar ratio is outside the above range, the catalyst activity or the stereoregularity may be sometimes insufficient.

The halogen-containing silicon compound (c3) is used in such an amount that the molar ratio of the halogen to the alkoxy group of the alkoxy-group-containing magnesium compound (b3) is 0.50 or more, preferably 0.60 to 4.0, more preferably 1.0 to 2.5. When the above amount is much smaller than the above range, the catalyst activity or the effect on improvement in stereoregularity is not fully exhibited, and a formed polymer is caused to have an increased amount of a fine powder and a decreased bulk density. Even when the above amount is too large, there is no further effect produced on these improvements.

After the above compounds (a3) to (c3) or the compounds (a3) to (d3) are all added, they are brought into contact and reacted preferably in a temperature range of 120 to 150° C., particularly preferably 125 to 140° C. When the contact temperature is outside the above range, the catalyst activity or the effect on improvement in stereoregularity is sometimes not fully exhibited. The contact time period, the pressure during the contacting and the stirring during the contacting procedures are as explained with regard to the preparation of the solid catalyst component [A1]. These contact conditions are also applicable to the contact reaction that is carried out with the halogen-containing titanium compound (a3) for the second time or more.

When a solvent is used in the contact procedure of the halogen-containing titanium compound (a3), the amount of the solvent per mole of the halogen-containing titanium compound (a3) is generally 5,000 milliliters or less, preferably 10 to 1,000 milliliters. When the above ratio is outside the above range, the contact uniformity and the contact efficiency may be degraded.

Concerning the temperature for the washing with an inert solvent after the contact reaction of the above halogen-containing titanium compound (a3), it is preferred to carry out the washing with the inert solvent at a temperature of 100 to 150° C., particularly preferably 120 to 140° C., after the first contact reaction of the halogen-containing titanium compound (a3), since a larger effect is sometimes produced on improvements in the catalyst activity and stereoregularity in this case. The above inert solvent can be selected from those inert solvents explained with regard to the preparation of the solid catalyst component [A1].

Further, after the contact reaction that is carried out for the second time or more with the halogen-containing titanium compound (a3), the washing temperature, the washing method, the amount of the inert solvent, the washing time period, the number of times of the washing, the washing pressure and the stirring during the washing are as explained with regard to the preparation of the solid catalyst component [A1]. The thus-obtained solid catalyst component [A3] can be stored in a dry state or in an inert solvent such as a hydrocarbon.

In the above-obtained solid catalyst component [A3], preferably, the molar ratio of the residual alkoxy group to the supported titanium is 0.30 or less.

Further, the above molar ratio is more preferably 0.20 or less, still more preferably 0.15 or less.

The residual alkoxy group content (RO) is preferably 0.13 mmol/g or less. The reason therefor is that when the residual alkoxy group content exceeds 0.13 mmol/g, the polymerization activity is low, the catalyst cost increases and the content of catalyst residues such as Cl, etc., in a powder increases, so that the product quality is sometimes degraded.

Further, the residual alkoxy group content is more preferably 0.10 mmol/g, still more preferably 0.08 mmol/g.

Further, the amount of the supported titanium is preferably 1.5% by weight or more. The reason therefor is that when the amount of the supported titanium is less than 1.5% by weight, the activity per the catalyst is sometimes low even if the activity per titanium is high (even if the RO/Ti is low).

Further, the amount of the supported titanium is more preferably 1.8% by weight or more, still more preferably 2.0% by weight or more.

When the electron-donating compound (d3) is used for preparing the solid catalyst component [A3], it is easier to satisfy the above preferred values with regard to the molar ratio, the residual alkoxy content and the amount of the supported titanium.

Further, the residual alkoxy group content can be controlled when the specific support is selected as such or when the catalyst preparation conditions are controlled.

The amount of the supported titanium can be controlled when the catalyst preparation conditions, particularly, the reaction temperature of the compound (a3) with each component and the temperature for the washing after the reaction of the compound (a3) are set at the specific temperatures.

Method of Preparing Solid Catalyst Component [A4]

The method of preparing the solid catalyst component [A4] is a method in which the above halogen-containing titanium compound (a4), the alkoxy-group-containing magnesium compound (b4) and optionally, the electron-donating compound (c4) are allowed to react in the presence of an aromatic hydrocarbon solvent.

In a preferred embodiment of the preparation method, the halogen-containing titanium compound (a4), the alkoxy-group-containing magnesium compound (b4) and optionally, the electron-donating compound (c4) are allowed to react in the presence of an aromatic hydrocarbon solvent at a temperature of 120° C. or higher but 150° C. or lower, the reaction mixture is washed with an inert solvent, the halogen-containing titanium compound (a4) is allowed to react further at least once at a temperature of 120° C. or higher but 150° C. or lower and the reaction product is washed with an inert solvent.

As described above, the compounds (a4) to (c4) are brought into contact and reacted at the specific temperature and then the halogen-containing titanium compound (a4) is again (at least once) brought into contact and reacted at the specific temperature, whereby the polymer activity can be improved.

Further, it is preferred to bring the electron-donating compound (c4) into contact after the halogen-containing titanium compound (a4) and the alkoxy-group-containing magnesium compound (b4) are brought into contact with an aromatic hydrocarbon solvent, since the polymerization activity in this case can be improved.

Any aromatic hydrocarbon solvent can be used so long as it is in a liquid state at room temperature. Examples thereof include benzene, toluene, xylene, ethylbenzene, propylbenzene and trimethylbenzene. Of these, toluene, xylene and ethylbenzene are preferred.

The amount of the halogen-containing titanium compound (a4) per mole of magnesium of the above alkoxy-group-containing magnesium compound (b4) is generally 0.5 to 100 mol, preferably 1 to 50 mol. When the above molar ratio is outside the above range, the catalyst activity is sometimes insufficient.

Further, the amount of the electron-donating compound (c4) per mole of magnesium of the above alkoxy-group-containing magnesium compound (b4) is generally 0.01 to 10 mol, preferably 0.05 to 1.0 mol. When the above molar ratio is outside the above range, the catalyst activity or the stereoregularity is sometimes insufficient.

The solvent for use in the above first reaction for supporting the halogen-containing titanium compound (a4) is essentially an aromatic hydrocarbon. When the above solvent is replaced, for example, with an aliphatic or alicyclic hydrocarbon such as octane, decane or ethylcyclohexane or halogenated hydrocarbon such as chlorobenzene, tetrachloroethane or chlorofluorocarbon, no sufficient performances can be attained with regard to the polymerization activity, and the like.

After the above compounds (a4) and (b4) or the above compounds (a4) to (c4) are all added, they are brought into contact and reacted preferably in the temperature range of 120 to 150° C., particularly preferably 125 to 140° C. The above contact temperature is outside the above range, the catalyst activity or the effect on improvement in stereoregularity is sometimes not fully exhibited. The contact time period, the pressure during the contact and the stirring during the contact procedures are as explained with regard to the preparation of the solid catalyst component [A1]. These contact conditions are also applicable to the contact reaction that is carried out for the second time or more with regard to the halogen-containing titanium compound (a).

In the procedure of bringing the halogen-containing titanium compound (a) into contact, the amount of the aromatic hydrocarbon solvent per mole of the halogen-containing titanium compound (a) is generally 5,000 milliliters or less, preferably 10 to 1,000 milliliters. When the above molar ratio is outside the above range, the contact uniformity or the contact efficiency may be degraded.

After the first contact reaction of the halogen-containing titanium compound (a4), the reaction product from the contact reaction of the above halogen-containing titanium compound (a4) is washed with an inert solvent preferably at a temperature of 100 to 150° C., particularly preferably 120 to 140° C., whereby the catalyst activity or the effect on improvement in stereoregularity is sometimes improved. The above inert solvent can be selected from those inert solvents explained with regard to the preparation of the solid catalyst component [A1].

Further, after the contact reaction that is carried out with the halogen-containing titanium compound (a4) for the second time or more, the washing temperature, the washing method, the amount of the inert solvent, the washing time period, the number of times of washing, the washing pressure and the stirring during the washing are as explained with regard to the preparation of the solid catalyst component [A1]. The thus-obtained solid catalyst component [A4] can be stored in a dry state or in an inert solvent such as a hydrocarbon.

In the above-obtained solid catalyst component [A4], the molar ratio (RO/Ti) of the residual alkoxy group content (RO) to the supported titanium (Ti) is preferably 0.25 or less.

The above molar ratio is more preferably 0.15 or less, still more preferably 0.13 or less.

Further, the residual alkoxy group content (RO) is preferably 0.15 mmol/g or less. The reason therefor is that when the residual alkoxy group content exceeds 0.15 mmol/g, the polymerization activity is low, the catalyst cost is increased, and the amount of catalyst residues such as Cl, etc., in a powder increases, so that the product quality is sometimes degraded.

Further, the residual alkoxy group content is more preferably 0.09 mmol/g or less, still more preferably 0.07 mmol/g or less.

Further, the amount of the supported titanium is preferably 1.5% by weight or more. The reason therefor is that when the amount of the supported titanium is less than 1.5% by weight, the activity per the catalyst is sometimes low even if the activity per titanium is high (even if the RO/Ti is low).

Further, the amount of the supported titanium is more preferably 1.8% by weight or more, still more preferably 2.0% by weight or more.

When the electron-donating compound (c4) is used for preparing the solid catalyst component [A4], it is easier to satisfy the above preferred values with regard to the molar ratio, the residual alkoxy content and the amount of the supported titanium.

Further, the residual alkoxy group content can be controlled when the specific support is used or when the catalyst preparation conditions are set at the specific conditions.

The amount of the supported titanium can be controlled when the catalyst preparation conditions, particularly, the reaction temperature of the compound (a4) with each component and the temperature for the washing after the reaction of the compound (a4) are set at the specific temperatures.

3. Process for Producing Olefin Polymer

Concerning the amount of each of the catalysts for olefin polymerization, provided by the present invention, each of the solid catalyst components [A1] to [A4] is used in such an amount that the titanium atom amount per liter of a reaction volume is generally in the range of 0.00005 to 1 mmol.

The organic aluminum compound [B] is used in such an amount that the aluminum/titanium (atomic ratio) is generally in the range of 1 to 1,000, preferably 10 to 500. When the above atomic ratio is outside the above range, the catalyst activity is sometimes insufficient.

Further, the electron-donating compound [C] is used in such an amount that the [C]/[B] (molar ratio) is generally in the range of 0.001 to 5.0, preferably 0.01 to 2.0, more preferably 0.05 to 1.0. When the above molar ratio is outside the above range, the sufficient catalyst activity or the stereoregularity sometimes cannot be obtained. When a preliminary polymerization is carried out, however, the amount of the electron-donating compound [C] can be further decreased.

The olefin for use in the present invention is preferably an α-olefin of the following general formula (IV).

$$R^5-CH=CH_2 \quad (IV)$$

In the above general formula (IV), $R^5$ is a hydrogen atom or a hydrocarbon group, and the hydrocarbon group may be saturated or unsaturated, may be linear or branched, or may be cyclic. Specific examples of the olefin include ethylene, propylene, 1-butene, 1-pentene, 1-hexene, 1-heptene, 1-octene, 1-decene, 3-methyl-1-pentene, 4-methyl-1-pentene, vinylcyclohexane, butadiene, isoprene, piperylene, and the like. These olefins may be used solely, or two or more olefins of these may be used in combination. Of the above olefins, ethylene and propylene are particularly preferred.

In the polymerization of an olefin in the present invention, the preliminary polymerization of an olefin may be carried out as required before the regular polymerization thereof in view of the catalyst activity during the polymerization and the stereoregularity and power form of an olefin polymer. In this case, the preliminary polymerization of an olefin is carried out in the presence of a catalyst that is a mixture of predetermined amounts of one of the solid catalyst components [A1] to [A4], the organic aluminum compound [B] and optionally the electron-donating compound [C] generally in the temperature range of 1 to 100° C. under a pressure of atmospheric pressure to approximately 5 MPa, and then the main polymerization of the olefin is carried out in the presence of the catalyst and the preliminary polymerization product.

In the polymerization procedure of the above main polymerization, any one of solution polymerization, slurry polymerization, gaseous phase polymerization, bulk polymerization, etc., can be employed. Further, any one a batch method polymerization and a continuous polymerization can be employed, and there can be employed two-step polymerization or multi-step polymerization that is carried out under different conditions.

Concerning the reaction conditions, further, the polymerization pressure therefor is generally selected from the range of atmospheric pressure to 8 MPa, preferably 0.2 to 5 MPa, and the polymerization temperature is generally selected from the range of 0 to 200° C., preferably 30 to 100° C., as required in view of polymerization activity. Although differing depending upon olefins and the polymerization temperature, the polymerization time period is generally 5 minutes to 20 hours, preferably approximately 10 minutes to 10 hours.

The molecular weight of an olefin polymer can be adjusted by adding a chain transfer agent, preferably, hydrogen. Further, an inert gas such as nitrogen may be present. Further, as far as the catalyst component in the present invention is concerned, there may be employed a constitution in which one of the solid catalyst components [A1] to [A4], the organic aluminum compound [B] and the electron-donating compound [C] are mixed in predetermined amounts, and immediately thereafter, an olefin is introduced for polymerization. Alternatively, there may be employed a constitution in which the above mixture is aged for approximately 0.2 to 3 hours after the contact, and then an olefin is introduced for polymerization. Further, the above catalyst component may be suspended in an inert solvent, an olefin, or the like and fed. In the present invention, the post treatment after the polymerization can be carried out according to a conventional method. That is, in a gaseous phase polymerization method, a nitrogen current may be allowed to pass through particles of a polymer powder introduced out of a polymerizer after the polymerization, for removing an olefin contained therein. Further, a polymer may be pelletized with an extruder as required, and in this case, a small amount of water, an alcohol or the like may be added for deactivating the catalyst completely. In a bulk polymerization method, a polymer that is withdrawn from a polymerizer after the polymerization can be pelletized after a monomer is completely separated from the polymer.

In the present invention, preferably, the residual Cl content in an olefin polymer obtained in the presence of the catalyst for olefin polymerization is 35 ppm or less. The reason therefor is that when the residual Cl content exceeds 35 ppm, not only the neutralizer cost increases, but also it sometimes induces the corrosion of a mold and foaming during molding and the formation of a foreign matter.

The residual Cl content is more preferably 30 ppm or less, still more preferably 25 ppm or less.

EXAMPLES

The present invention will be explained with reference to Examples hereinafter, while the present invention shall not be limited to the following Examples. Average particle diameters (D50) of oxides (a1) and (a2) and alkoxy-group-containing magnesium compounds (b3) and (b4), residual alkoxy group contents in solid catalyst components, amounts of supported Ti, bulk densities, average particle diameters (D50) and fine and coarse powder amounts of polymer powders and intrinsic viscosities [η], stereoregularity [mmmm] and Cl contents of polymers were determined as follows.

(1) Average particle diameters (D50) of oxides (a1) and (a2) and compounds (b3) and (b4): An oxide (a1) or (a2) or a compound (b3) or (b4) was suspended in a hydrocarbon solvent and measured by a light transmission method. A particle diameter distribution obtained by the above method was plotted on a logarithmic-normal probability paper, and a 50% particle diameter was determined as an average particle diameter.

(2) Residual alkoxy group content of solid catalyst component: A solid catalyst component was fully dried, accurately weighed, hermetically charged into a vial and fully hydrolyzed with 1.2 N hydrochloric acid. Then, an insoluble was filtered off, a filtrate was measured for an alcohol content by gas chromatography, and a corresponding residual alkoxy content was calculated.

(3) Amount of supported Ti of solid catalyst component: A solid catalyst component was fully dried, then accurately weighed and fully hydrolyzed with 3N sulfuric acid. Then, an insoluble was filtered off, and phosphoric acid as a masking agent was added to a filtrate. Further, a 3% hydrogen peroxide aqueous solution was added to develop a color. The thus-prepared solution was measured for an absorbance at 420 nm by FT-IR, to determine a Ti concentration, and the amount of supported Ti of the solid catalyst component was calculated.

(4) Bulk density of polymer powder: Measured according to JIS K 6721.

(5) Average particle diameter (D50), fine powder amount and coarse powder amount of polymer powder: A particle diameter distribution measured with sieves was plotted on a logarithmic-normal probability paper, and a 50% particle diameter was used as an average particle diameter. Further, a weight percentage of a powder passing through a mesh opening size of 250 μm or less was defined as a fine powder amount, a weight percentage of a powder not passing through a mesh opening size of 2,830 μm or greater was defined as a coarse powder amount, and these percentages were determined.

(6) Intrinsic viscosity [η] of polymer: A polymer was dissolved in decalin and measured at 135° C.

(7) Stereoregularity of polymer [mmmm]:

A polymer was dissolved in a solution of a 1,2,4-trichlorobenzene/heavy-benzene mixture having a ratio of 90:10 (volume ratio), and the stereoregularity of a polymer was quantitatively determined on the basis of signals of methyl groups measured with a 13C-NMR (trade name: LA-500, manufactured by JEOL Ltd.) at 130° C. by a proton complete decoupling method.

An isotactic pentad fraction [mmmm] refers to an isotactic fraction in pentad units of a polypropylene molecule chain, proposed by A. Zambelli, et al., in Macromolecules, Vol. 6, page 925 (1973) and determined on the basis of 13C-NMR spectrum.

Further, a method of determining assignment of peaks of 13C-NMR spectrum was according to the assignment proposed by A. Zambelli, et al., in Macromolecules, Vol. 8, page 687 (1975).

(8) Cl content in polymer: A sample was hot-pressed to prepare a plate, and the Cl content was quantitatively determined by a fluorescence X-ray analysis method.

Example 1

(1) Preparation of Oxide of Element of Group II to IV Elements, the Oxide Supporting Alcohol-free Halogen-containing Magnesium Compound A three-necked flask with a stirrer, having an internal volume of 0.5 liter, was subjected to replacement of an atmosphere therein with nitrogen gas, and then, 200 milliliters of dehydrated heptane, 40 g of silica gel (Si: 0.666 mmol) having an average particle diameter D50 of 50 μm, a specific surface area of 300 m$^2$/g and a pore volume of 1.6 cm$^3$/g and 0.166 mmol of butyloctylmagnesium were mixed and heated at 90° C. for 1.5 hours. Then, the mixture was cooled to 20° C., and a hydrogen chloride gas (1.66 mmol) was allowed to pass to carry out chlorination for 30 minutes. Then, the reaction product was washed with 200 milliliters of dehydrated heptane three times at room temperature, and the thus-obtained solid was analyzed for components to show that it had a magnesium content of 7.9 wt % and a chlorine content of 22.5 wt % (Cl/Mg molar ratio: 1.95).

(2) Preparation of Solid Catalyst Component

A three-necked flask with a stirrer, having an internal volume of 0.5 liter, was subjected to replacement of an atmosphere therein with nitrogen gas, and then the flask was charged with 80 milliliters of dehydrated octane and 16 g (Mg: 0.052 mol) of the silica support supporting magnesium chloride, prepared in the above (1). The mixture was cooled to 5° C., 9.15 milliliters (0.156 mol) of dehydrated ethanol was dropwise added over 15 minutes, and the mixture was heated at 80° C. for 1.5 hours. The resultant suspension was cooled to 40° C., 2.97 milliliters (0.026 mol) of silicon tetrachloride was added, and the mixture was stirred for 4 hours. Then, 77 milliliters (0.702 mol) of titanium tetrachloride was dropwise added, the solution thereof was temperature-increased to 65° C., and 1.39 milliliters (0.0052 mol) of di-n-butyl phthalate was added. Then, the mixture was stirred at an internal temperature of 125° C. for 1 hour to carry out a contacting procedure, the stirring was stopped to precipitate a solid, and a supernatant was withdrawn. To the remaining reaction product was added 100 milliliters of dehydrated octane, and the mixture was temperature-increased to 125° C. with stirring and maintained for 1 minute. The stirring was stopped to precipitate a solid, and a supernatant was withdrawn. This washing procedure was repeated 7 times. Then, 122 milliliters (1.11 mol) of titanium tetrachloride was added, the mixture was stirred at an internal temperature of 125° C. for 2 hours to carry out a contacting procedure, and the above washing with dehydrated octane at 125° C. was carried out 7 times, to give a solid catalyst component. Table 1 shows the evaluation results thereof.

(3) Propylene Polymerization

An autoclave made of stainless steel with a stirrer, having an internal volume of 1 liter, was fully dried and then subjected to replacement of an atmosphere therein with nitrogen, and then the autoclave was charged with 400 milliliters of dehydrated heptane at room temperature. The autoclave was further charged with 2.0 mmol of triethylaluminum, 0.25 mmol of dicyclopentyldimethoxysilane and 0.0025 mmol, as Ti atom, of the solid catalyst component prepared in the above (2), and hydrogen was introduced up to 0.1 MPa. Then, while propylene was introduced, the autoclave was temperature-increased to 80° C. and pressure-increased to a total pressure of 0.8 MPa, followed by polymerization for 1 hour. Then, the temperature and the pressure in the autoclave were decreased, and the reaction product was taken out and poured into 2 liters of methanol to deactivate the catalyst. The product was separated by filtration and vacuum-dried to give a polypropylene. Table 1 shows the evaluation results thereof.

Example 2

(1) Preparation of Solid Catalyst Component

A solid catalyst component was obtained in the same manner as in Example 1 except that the temperature for the washing with the octane after the titanium-tetrachloride-supporting reaction carried out for the second time in Example 1(2) was changed to room temperature, and the thus-obtained solid catalyst component was evaluated. Table 1 shows the results.

(2) Propylene Polymerization

Propylene was polymerized in the same manner as in Example 1 except that the procedures in Example 1(3) were modified so that the dicyclopentyldimethoxysilane was replaced with 0.5 mmol of cyclohexylmethyldimethoxysilane, that 0.005 mmol, as Ti atom, of the solid catalyst component prepared in the above (1) was added and that hydrogen was introduced up to 0.05 MPa. The thus-obtained polypropylene was evaluated. Table 1 shows the results.

Example 3

(1) Preparation of Solid Catalyst Component

A three-necked flask with a stirrer, having an internal volume of 0.5 liter, was subjected to replacement of an atmosphere therein with nitrogen gas, and then the flask was charged with 80 milliliters of dehydrated octane and 16 g (Mg: 0.052 mol) of the magnesium-chloride-supporting silica support prepared in Example 1(1). The mixture was cooled to 5° C., 9.15 milliliters (0.156 mol) of dehydrated ethanol was dropwise added over 15 minutes, and the mixture was heated at 80° C. for 1.5 hours. The resultant suspension was cooled to 40° C., 2.97 milliliters (0.026 mol) of silicon tetrachloride was added, the mixture was stirred for 4 hours, and then 77 milliliters (0.702 mol) of titanium tetrachloride was dropwise added. The resultant solution was temperature-increased up to 65° C., and 1.39 milliliters (0.0052 mol) of di-n-butyl phthalate was added. Then, the mixture was stirred at an internal temperature of 125° C. for 1 hour to carry out a contacting procedure. The stirring was stopped to precipitate a solid, and a supernatant was withdrawn. To the remaining reaction product was added 100 milliliters of dehydrated octane, and the mixture was temperature-increased to 125° C. with stirring and maintained for 1 minute. The stirring was stopped to precipitate a solid, and a supernatant was withdrawn. This washing procedure was repeated 7 times. Then, 122 milliliters (1.11 mol) of titanium tetrachloride was added, the mixture was stirred at an internal temperature of 125° C. for 2 hours to carry out a contacting procedure, and the above washing with dehydrated octane at 125° C. was repeated 7 times. Further, 122 milliliters (1.11 mol) of titanium tetrachloride was added, the mixture was stirred at an internal temperature of 125° C. for 2 hours to carry out a contacting procedure, and the above washing with dehydrated octane at 125° C. was repeated 7 times. The thus-obtained solid catalyst component was evaluated. Table 1 shows the results.

(2) Propylene Polymerization

Propylene was polymerized in the same manner as in Example 1 except that the solid catalyst component prepared in the above (1) was used in Example 1(3). The thus-obtained polypropylene was evaluated. Table 1 shows the results.

Example 4

(1) Preparation of Solid Catalyst Component

A solid catalyst component was prepared in the same manner as in Example 1 except that the procedures in Example 1(2) were modified so that the octane was replaced with decane and that the temperatures for the supporting reaction and the washing were changed to 135° C. The thus-obtained solid catalyst component was evaluated. Table 1 shows the results.

(2) Propylene Polymerization

Propylene was polymerized in the same manner as in Example 1 except that the solid catalyst component prepared in the above (1) was used in Example 1(2). The thus-obtained polypropylene was evaluated. Table 1 shows the results.

Comparative Example 1

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g (Mg: 0.052 mol) of the magnesium-chloride-supporting silica support prepared in Example 1(1). The mixture was cooled to 5° C., 9.15 milliliters (0.156 mol) of dehydrated ethanol was dropwise added over 15 minutes, and the mixture was heated at 80° C. for 1.5 hours. The resultant suspension was cooled to 70° C., and 1.39 milliliters (0.0052 mol) of di-n-butyl phthalate was added. The resultant solution was temperature-increased up to 80° C., then, 77 milliliters (0.70 mol) of titanium tetrachloride was dropwise added, and the mixture was stirred at an internal temperature of 110° C. for 2 hours to carry out a contacting procedure. Then, the stirring was stopped to precipitate a solid, and a supernatant was withdrawn. To the remaining reaction mixture was added 100 milliliter of dehydrated heptane, and the mixture was temperature-increased up to 90° C. with stirring and maintained for 1 minute. The stirring was stopped to precipitate a solid, and a supernatant was withdrawn. The above washing procedure was repeated 7 times. Then, 122 milliliters (1.11 mol) of titanium tetrachloride was added, the mixture was stirred at an internal temperature of 110° C. for 2 hours to carry out a contacting procedure, the stirring was stopped to precipitate a solid, and a supernatant was withdrawn. Then, the above washing with heptane at 90° C. was repeated 7 times, and the thus-obtained solid catalyst component was evaluated. Table 1 shows the results.

(2) Propylene Polymerization

Propylene was polymerized in the same manner as in Example 1 except that the solid catalyst component prepared in the above (1) was used in Example 1(2). The thus-obtained polypropylene was evaluated. Table 1 shows the results.

Comparative Example 2

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g (Mg: 0.052 mol) of the magnesium-chloride-supporting silica support prepared in Example 1(1). The mixture was cooled to 5° C., 9.15 milliliters (0.156 mol) of dehydrated ethanol was dropwise added over 15 minutes, and the mixture was heated at 80° C. for 1.5 hours. The resultant suspension was cooled to 40° C., 0.89 milliliters (0.0078 mol) of silicon tetrachloride was added and the mixture was stirred for 40 minutes. The mixture was temperature-increased up to 70° C., then, 1.39 milliliters (0.0052 mol) of di-n-butyl phthalate was added. The resultant solution was temperature-increased up to 80° C., then, 77 milliliters (0.70 mol) of titanium tetrachloride was dropwise added, the mixture was stirred at an internal temperature of 110° C. for 2 hours, to carry out a contacting procedure. Then, the stirring was stopped to precipitate a solid, and a supernatant was withdrawn. To the remaining reaction mixture was added 100 milliliters of dehydrated heptane, and the mixture was temperature-increased up to 90° C. with stirring and maintained for 1 minute. Then, the stirring was stopped to precipitate a solid, and a supernatant was withdrawn. The above washing procedure was repeated 7 times. Then, 122 milliliters (1.11 mol) of titanium tetrachloride was added, the mixture was stirred at an internal temperature of 110° C. for 2 hours to carry out a contacting procedure, the stirring was stopped to precipitate a solid, and a supernatant was withdrawn. Then, the above washing procedure at 90° C. with heptane was repeated 7 times, and the thus-obtained solid catalyst component was evaluated. Table 1 shows the results.

(2) Propylene Polymerization

Propylene was polymerized in the same manner as in Example 1 except that the solid catalyst component prepared in the above (1) was used in Example 1(2). The thus-obtained polypropylene was evaluated. Table 1 shows the results.

As is clearly shown in Table, according to Examples, the solid catalyst components have high polymerization activity, and there can be obtained olefin polymers whose residual Cl content is small and which are excellent in stereoregularity and a powder form.

TABLE 1

| | | Unit | Example 1 | Example 2 | Example 3 | Example 4 | Comparative Example 1 | Comparative Example 2 |
|---|---|---|---|---|---|---|---|---|
| Compound (a1) | Mg content | (wt %) | 7.9 | 7.9 | 7.9 | 7.9 | 7.9 | 7.9 |
| | Cl content | (wt %) | 23.0 | 23.0 | 23.0 | 23.0 | 23.0 | 23.0 |
| | $D_{50}$ | (μm) | 50 | 50 | 50 | 50 | 50 | 50 |
| Catalyst | Reaction temperature | (° C.) | 125 | 125 | 125 | 135 | 110 | 110 |
| | Washing temperature* | (° C.) | 125 | 125→r. t. | 125 | 135 | 90 | 90 |
| | EtOH/Mg | (molar ratio) | 3.0 | 3.0 | 3.0 | 3.0 | 3.0 | 3.0 |
| | $SiCl_4$/Mg | (molar ratio) | 0.5 | 0.5 | 0.5 | 0.5 | 0 | 0.15 |
| | Number of times of supporting | | 2 | 2 | 3 | 2 | 2 | 2 |
| | Order of contacting* | | OH→Si→Ti→ID | OH→Si→Ti→ID | OH→Si→Ti→ID | OH→Si→Ti→ID | OH→ID→Ti | OH→Si→ID→Ti |
| | Residual alkoxy group content | (mmol/g) | 0.132 | 0.145 | 0.117 | 0.134 | 0.533 | 0.461 |
| | Amount of supported Ti | (mmol/g) | 0.401 | 0.660 | 0.376 | 0.395 | 0.710 | 0.668 |
| | Alkoxy group/Ti | (molar ratio) | 0.33 | 0.22 | 0.31 | 0.34 | 0.75 | 0.69 |
| | Amount of supported Ti | (wt %) | 1.92 | 3.16 | 1.80 | 1.89 | 3.40 | 3.20 |
| Olefin polymer | Polymerization activity | (kg/g-Ti) | 540 | 310 | 600 | 540 | 130 | 150 |
| | Polymerization activity | (kg/g-Cat) | 10.4 | 9.8 | 10.8 | 10.2 | 4.4 | 4.8 |
| | Cl content | (ppm) | 20 | 25 | 19 | 21 | 47 | 43 |
| | [η] | (dL/g) | 1.21 | 1.29 | 1.24 | 1.27 | 1.26 | 1.26 |
| | Stereoregularity | (mol %) | 99.6 | 98.1 | 99.5 | 99.5 | 99.0 | 99.2 |
| | $D_{50}$ | (μm) | 980 | 890 | 1020 | 960 | 550 | 570 |
| | Fine powder amount (<250 μm) | (wt %) | 3.0 | 3.4 | 2.8 | 3.1 | 7.5 | 5.3 |
| | Coarse powder amount (>2830 μm) | (wt %) | 0.3 | 0.4 | 0.3 | 0.5 | 1.0 | 0.4 |
| | Bulk density | (g/mL) | 0.41 | 0.40 | 0.42 | 0.40 | 0.34 | 0.37 |

Washing temperature: r. t.: room temperature
Order of contacting: OH: ethanol (compound (b1), Si: silicon tetrachloride (compound (c1)), ID: internal donor (compound (d1)), Ti: titanium tetrachloride (compound (e))

Example 5

(1) Preparation of Solid Oxide Supporting Alkoxy-Group-Containing Magnesium Compound A three-necked flask with a stirrer, having an internal volume of 0.5 liter, was subjected to replacement of an atmosphere therein with nitrogen gas, and 200 milliliters of dehydrated heptane, 40 g (667 mmol) of silica gel having an average particle diameter $D_{50}$ of 50 μm, a specific surface area of 300 m²/g and a pore volume of 1.6 cm³/g and butylethylmagnesium (222 mmol) were mixed, followed by heating at 90° C. for 1.5 hours. Then, the reaction mixture was cooled to 5° C., 28.6 milliliters (489 mmol) of ethanol was dropwise added, and the mixture was heated at 80° C. for 1 hour. Then, the reaction product was washed with 200 milliliter of dehydrated heptane at room temperature 3 times, and the thus-obtained solid was analyzed for a composition to show that it had a magnesium content of 6.9 wt % and an ethoxy content of 23.7 wt % (OEt/Mg molar ratio: 1.85).

(2) Preparation of Solid Catalyst Component

A three-necked flask with a stirrer, having an internal volume of 0.5 liter, was subjected to replacement of an atmosphere therein with nitrogen gas and charged with 80 milliliters of dehydrated octane and 16 g (Mg: 45.4 mmol) of the silica support supporting magnesium ethoxide prepared in the above (1). At 40° C., 2.60 milliliters (22.7 mmol) of silicon tetrachloride was dropwise added, and the mixture was stirred for 4 hours. Then, 77 milliliters (702 mmol) of titanium tetrachloride was dropwise added, the resultant solution was temperature-increased up to 65° C., and then 1.21 milliliters (4.54 mmol) of di-n-butyl phthalate was added. Then, the mixture was stirred at an internal temperature of 125° C. for 1 hour to carry out a contacting procedure, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. The stirring was stopped to precipitate a solid, and a supernatant was withdrawn. The above washing procedure was repeated 7 times. Then, 122 milliliters (1.11 mol) of titanium tetrachloride was added, the mixture was stirred at an internal temperature of 125° C. for 2 hours to carry out a contacting procedure, and then the above washing with dehydrated octane at 125° C. was carried out 7 times to give a solid catalyst component. The thus-obtained solid catalyst component was evaluated. Table 2 shows the results.

(3) Propylene Polymerization

An autoclave made of stainless steel with a stirrer, having an internal volume of 1 liter, was fully dried and then subjected to replacement of an atmosphere therein with nitrogen, and then the autoclave was charged with 400 milliliters of dehydrated heptane at room temperature. The autoclave was further charged with 2.0 mmol of triethylaluminum, 0.25 mmol of dicyclopentyldimethoxysilane and 0.0025 mmol, as Ti atom, of the solid catalyst component prepared in the above (2), and hydrogen was introduced up to 0.1 MPa. Then, while propylene was introduced, the autoclave was temperature-increased to 80° C. and pressure-increased to a total pressure of 0.8 MPa, followed by polymerization for 1 hour.

Then, the temperature and the pressure in the autoclave were decreased, and the reaction product was taken out and poured into 2 liters of methanol to deactivate the catalyst. The product was separated by filtration and vacuum-dried to give a polypropylene. Table 1 shows the evaluation results thereof.

Example 6

(1) Preparation of Solid Catalyst Component

A solid catalyst component was obtained in the same manner as in Example 5 except that the temperature for the washing with the octane after the titanium-tetrachloride-supporting reaction carried out for the second time in Example 5(2) was changed to room temperature, and the thus-obtained solid catalyst component was evaluated. Table 2 shows the results.

(2) Propylene Polymerization

Propylene was polymerized in the same manner as in Example 5 except that the procedures in Example 5(3) were modified so that the dicyclopentyldimethoxysilane was replaced with 0.5 mmol of cyclohexylmethyldimethoxysilane, that 0.005 mmol, as Ti atom, of the solid catalyst component prepared in the above (1) was added and that hydrogen was introduced up to 0.05 MPa. The thus-obtained polypropylene was evaluated. Table 2 shows the results.

Example 7

(1) Preparation of Solid Catalyst Component

A three-necked flask with a stirrer, having an internal volume of 0.5 liter, was subjected to replacement of an atmosphere therein with nitrogen gas and charged with 80 milliliters of dehydrated octane and 16 g (Mg: 45.4 mmol) of the silica support supporting magnesium ethoxide prepared in Example 5(1). At 40° C., 2.60 milliliters (22.7 mmol) of silicon tetrachloride was dropwise added, and the mixture was stirred for 4 hours. Then, 77 milliliters (702 mmol) of titanium tetrachloride was dropwise added, the resultant solution was temperature-increased up to 65° C., and then 1.21 milliliters (4.54 mmol) of di-n-butyl phthalate was added. Then, the mixture was stirred at an internal temperature of 125° C. for 1 hour to carry out a contacting procedure, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. The stirring was stopped to precipitate a solid, and a supernatant was withdrawn. The above washing procedure was repeated 7 times. Then, 122 milliliters (1.11 mol) of titanium tetrachloride was added, the mixture was stirred at an internal temperature of 125° C. for 2 hours to carry out a contacting procedure, and then the above washing with dehydrated octane at 125° C. was repeated 7 times. Further, 122 milliliters (1.11 mol) of titanium tetrachloride was added, the mixture was stirred at an internal temperature of 125° C. for 2 hours to carry out a contacting procedure, and then the above washing with dehydrated octane at 125° C. was repeated 7 times, to give a solid catalyst component. The thus-obtained solid catalyst component was evaluated. Table 2 shows the results.

(2) Propylene Polymerization

Propylene was polymerized in the same manner as in Example 5 except that the solid catalyst component prepared in the above (1) was used in Example 5(3). The thus-obtained polypropylene was evaluated. Table 2 shows the results.

Example 8

(1) Preparation of Solid Catalyst Component

A solid catalyst component was prepared in the same manner as in Example 5 except that the procedures in Example 5(2) were modified so that the octane was replaced with decane as preparation and washing solvent and that the reaction temperature and the washing temperature were changed to 135° C. The thus-obtained solid catalyst component was evaluated. Table 2 shows the results.

(2) Propylene Polymerization

Propylene was polymerized in the same manner as in Example 5 except that the solid catalyst component prepared in the above (1) was used in Example 5(3). The thus-obtained polypropylene was evaluated. Table 2 shows the results.

Example 9

(1) Preparation of Solid Oxide Supporting Alcohol Complex of Halogen-Containing Magnesium Compound A three-necked flask with a stirrer, having an internal volume of 0.5 liter, was subjected to replacement of an atmosphere therein with nitrogen gas, then, 12.7 g (133 mmol) of magnesium chloride was suspended in 127 milliliters of heptane, 73.4 milliliters (800 mmol) of butanol was dropwise added at 40° C., and the mixture was heated at 98° C. for 1 hour. Then, the reaction mixture was cooled to 70° C., 40 g (667 mmol) of silica gel having an average particle diameter D50 of 50 μm, a specific surface area of 300 m$^2$/g and a pore volume of 1.6 cm$^3$/g was added, the mixture was stirred for 0.5 hour. Further, the reaction product was washed with 200 milliliters of dehydrated heptane at room temperature 3 times, and the thus-obtained solid component was analyzed to show that it had a magnesium content of 4.0 wt %, a chlorine content of 11.3 wt % and a butoxy group content of 39.1 wt % (Cl/Mg molar ratio: 1.93, OBu/Mg molar ratio: 3.25).

(2) Preparation of Solid Catalyst Component

A three-necked flask with a stirrer, having an internal volume of 0.5 liter, was subjected to replacement of an atmosphere therein with nitrogen gas and charged with 80 milliliters of dehydrated octane and 16 g (Mg: 26.3 mmol) of the silica support supporting the butanol complex of magnesium chloride prepared in the above (1). At 40° C., 1.51 milliliters (13.2 mmol) of silicon tetrachloride was dropwise added, and the mixture was stirred for 4 hours. Then, 77 milliliters (702 mmol) of titanium tetrachloride was dropwise added, the resultant solution was temperature-increased up to 65° C., and then 0.70 milliliters (2.63 mmol) of di-n-butyl phthalate was added. Then, the mixture was stirred at an internal temperature of 125° C. for 1 hour to carry out a contacting procedure, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. The stirring was stopped to precipitate a solid, and a supernatant was withdrawn. The above washing procedure was repeated 7 times. Then, 122 milliliters (1.11 mol) of titanium tetrachloride was added, the mixture was stirred at an internal temperature of 125° C. for 2 hours to carry out a contacting procedure, and then the above washing with dehydrated octane at 125° C. was carried out 7 times to give a solid catalyst component. The thus-obtained solid catalyst component was evaluated. Table 2 shows the results.

(3) Propylene Polymerization

Propylene was polymerized in the same manner as in Example 5 except that the solid catalyst component prepared in the above (2) was used in Example 5(3). The thus-obtained polypropylene was evaluated. Table 2 shows the results.

Comparative Example 3

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g (Mg: 45.4 mmol) of the magnesium-ethoxide-supporting silica support prepared in Example 5(1). At 40° C., 2.60 milliliters (22.7 mmol) of silicon tetrachloride was dropwise added, and the mixture was stirred for 4 hours. Then, 77 milliliters (702 mmol) of titanium tetrachloride was dropwise added, the resultant solution was temperature-increased up to 65° C., and then 1.21 milliliters (4.54 mmol) of di-n-butyl phthalate was added. Then, the mixture was stirred at an internal temperature of 125° C. for 1 hour to carry out a contacting procedure, the stirring was stopped to precipitate a solid, and a supernatant was withdrawn. Further, 100 milliliters of dehydrated octane was added, and the mixture was stirred at room temperature. The stirring was stopped to precipitate a solid, and a supernatant was withdrawn. This washing procedure was repeated 7 times, and the thus-obtained solid catalyst component was evaluated. Table 2 shows the results.

(2) Propylene Polymerization

Propylene was polymerized in the same manner as in Example 5 except that the solid catalyst component prepared in the above (1) was used in Example 5(3). The thus-obtained polypropylene was evaluated. Table 2 shows the results.

Comparative Example 4

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated heptan and 16 g (Mg: 45.4 mmol) of the magnesium-ethoxide-supporting silica support prepared in Example 5(1). The mixture was heated up to 70° C., and 1.21 milliliters (4.54 mmol) of di-n-butyl phthalate was added. The resultant solution was temperature-increased up to 80° C., then, 77 milliliters (702 mmol) of titanium tetrachloride was dropwise added, and the mixture was stirred at an internal temperature of 110° C. for 2 hours to carry out a contacting procedure. Then, the stirring was stopped to precipitate a solid, and a supernatant was withdrawn. To the remaining reaction mixture was added 100 milliliters of dehydrated heptan, and the mixture was temperature-increased up to 90° C. with stirring and maintained for 1 minute. The stirring was stopped to precipitate a solid, and a supernatant was withdrawn. This washing procedure was repeated 7 times. Then, 122 milliliters (1.11 mol) of titanium tetrachloride was added, the mixture was stirred at an internal temperature of 110° C. for 2 hours to carry out a contacting procedure, the stirring was stopped to precipitate a solid, and a supernatant was withdrawn. Then, the above washing with heptane at 90° C. was repeated 7 times, and the thus-obtained solid catalyst component was evaluated. Table 2 shows the results.

(2) Propylene Polymerization

Propylene was polymerized in the same manner as in Example 5 except that the solid catalyst component prepared in the above (1) was used in Example 5(3). The thus-obtained polypropylene was evaluated. Table 2 shows the results.

As is clearly shown in Table, according to Examples, the solid catalyst components have high polymerization activity, and there can be obtained olefin polymers whose residual Cl content is small and which are excellent in stereoregularity and a powder form.

TABLE 2

| | | Unit | Example 5 | Example 6 | Example 7 | Example 8 | Example 9 | Comparative Example 3 | Comparative Example 4 |
|---|---|---|---|---|---|---|---|---|---|
| Oxide (a2) | Mg content | (wt %) | 6.9 | 6.9 | 6.9 | 6.9 | 4.0 | 6.9 | 6.9 |
| | OR content | (wt %) | 23.7 | 23.7 | 23.7 | 23.7 | 39.1 | 23.7 | 23.7 |
| | OR/Mg | (molar ratio) | 1.85 | 1.85 | 1.85 | 1.85 | 3.25 | 1.85 | 1.85 |
| | D$_{50}$ | (μm) | 50 | 50 | 50 | 50 | 50 | 50 | 50 |
| Catalyst | Reaction temperature | (° C.) | 125 | 125 | 125 | 135 | 125 | 125 | 110 |
| | Washing temperature* | (° C.) | 125 | 125→r. t. | 125 | 135 | 125 | r.t. | 90 |
| | SiCl$_4$/Mg | (molar ratio) | 0.5 | 0.5 | 0.5 | 0.5 | 0.5 | 0.5 | 0 |

TABLE 2-continued

|  |  | Unit | Example 5 | Example 6 | Example 7 | Example 8 | Example 9 | Comparative Example 3 | Comparative Example 4 |
|---|---|---|---|---|---|---|---|---|---|
|  | Number of times of supporting |  | 2 | 2 | 3 | 2 | 2 | 1 | 2 |
|  | Order of contacting* |  | Si→Ti→ID | Si→Ti→ID | Si→Ti→ID | Si→Ti→ID | Si→Ti→ID | Si→ID→Ti | ID→Ti |
|  | Residual alkoxy group content | (mmol/g) | 0.178 | 0.158 | 0.162 | 0.185 | 0.182 | 0.573 | 0.583 |
|  | Amount of supported Ti | (mmol/g) | 0.445 | 0.689 | 0.426 | 0.451 | 0.434 | 0.699 | 0.747 |
|  | Alkoxy group/Ti | (molar ratio) | 0.40 | 0.23 | 0.38 | 0.41 | 0.42 | 0.82 | 0.78 |
|  | Amount of supported Ti | (wt %) | 2.13 | 3.30 | 2.04 | 2.16 | 2.08 | 3.35 | 3.58 |
| Olefin polymer | Polymerization activity | (kg/g-Ti) | 430 | 270 | 480 | 420 | 390 | 90 | 110 |
|  | Polymerization activity | (kg/g-Cat) | 9.2 | 8.9 | 9.8 | 9.1 | 8.1 | 3.0 | 3.9 |
|  | Cl content | (ppm) | 23 | 27 | 21 | 23 | 25 | 84 | 65 |
|  | [η] | (dL/g) | 1.25 | 1.26 | 1.27 | 1.23 | 1.29 | 1.12 | 1.18 |
|  | Stereoregularity | (mol %) | 99.5 | 98.1 | 99.6 | 99.5 | 99.5 | 98.4 | 98.9 |
|  | $D_{50}$ | (μm) | 860 | 830 | 900 | 870 | 810 | 390 | 440 |
|  | Fine powder amount (<250 μm) | (wt %) | 3.2 | 3.6 | 2.8 | 3.4 | 3.3 | 6.0 | 5.8 |
|  | Coarse powder amount (>2830 μm) | (wt %) | 0.3 | 0.4 | 0.3 | 0.3 | 0.3 | 0.5 | 0.4 |
|  | Bulk density | (g/mL) | 0.40 | 0.39 | 0.41 | 0.40 | 0.38 | 0.35 | 0.36 |

Washing temperature: r. t.: room temperature
Order of contacting: Si: silicon tetrachloride (compound (b2)) ID: internal donor (compound (c2)) Ti: titanium tetrachloride (compound (d2))

Example 10

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.0057 at a reaction temperature of 50° C.; D50: 35 μm). The mixture was heated to 40° C., 8.0 milliliters of silicon tetrachloride (halogen/alkoxy group: 1.0) was added, the mixture was stirred for 4 hours, and then 3.4 milliliters of di-n-butyl phthalate was added. The resultant solution was temperature-increased up to 65° C., then, 77 milliliters of titanium tetrachloride was dropwise added, and the mixture was stirred at an internal temperature of 125° C. for 1 hour to carry out a contacting procedure. Then, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. Then, the stirring was stopped to precipitate a solid, and a supernatant was withdrawn. The above washing procedure was repeated 7 times. Then, 122 milliliters of titanium tetrachloride was added, the mixture was stirred at an internal temperature of 125° C. for 2 hours to carry out a contacting procedure, and then the above washing with dehydrated octane at 125° C. was carried out 6 times to give a solid catalyst component. Table 3 shows the evaluation results thereof.

(2) Propylene Polymerization

An autoclave made of stainless steel with a stirrer, having an internal volume of 1 liter, was fully dried and subjected to replacement of an atmosphere therein with nitrogen, and then the autoclave was charged with 400 milliliters of dehydrated heptane at room temperature. The autoclave was further charged with 2.0 mmol of triethylaluminum, 0.25 mmol of dicyclopentyldimethoxysilane and 0.0025 mmol, as Ti atom, of the solid catalyst component prepared in the above (1), and hydrogen was introduced up to 0.1 MPa. Then, while propylene was introduced, the autoclave was temperature-increased to 80° C. and pressure-increased to a total pressure of 0.8 MPa, followed by polymerization for 1 hour.

Then, the temperature and the pressure in the autoclave were decreased, and the reaction product was taken out and poured into 2 liters of methanol to deactivate the catalyst. The product was separated by filtration and vacuum-dried to give a polypropylene. Table 3 shows the evaluation results thereof.

Example 11

(1) Preparation of Solid Catalyst Component

A solid catalyst component was obtained in the same manner as in Example 10 except that the temperature for the washing with the octane after the titanium-tetrachloride-supporting reaction carried out for the second time in Example 10(1) was changed to room temperature, and the thus-obtained solid catalyst component was evaluated. Table 3 shows the results.

(2) Propylene Polymerization

Propylene was polymerized in the same manner as in Example 10 except that the procedures in Example 10(2) were modified so that the dicyclopentyldimethoxysilane was replaced with 0.5 mmol of cyclohexylmethyldimethoxysilane, that 0.005 mmol, as Ti atom, of the solid catalyst component prepared in the above (1) was added and that hydrogen was introduced up to 0.05 MPa. The thus-obtained polypropylene was evaluated. Table 3 shows the results.

Example 12

(1) Preparation of Solid Catalyst Component

A solid catalyst component was obtained in the same manner as in Example 10 except that diethoxymagnesium having an average particle diameter (D50) of 10 μm, which was obtained at an iodine/Mg gram atomic ratio of 0.00019 at a reaction temperature of 50° C., was used. The thus-obtained solid catalyst component was evaluated. Table 3 shows the results.

(2) Propylene Polymerization

Propylene was polymerized in the same manner as in Example 10 except that the solid catalyst component prepared in the above (1) was used in Example 10(2). The thus-obtained polypropylene was evaluated. Table 3 shows the results.

Example 13

(1) Preparation of Solid Catalyst Component

A solid catalyst component was obtained in the same manner as in Example 10 except that diethoxymagnesium having an average particle diameter (D50) of 70 μm, which was obtained at an iodine/Mg gram atomic ratio of 0.019 at a reaction temperature of 78° C., was used in Example 10 (1). The thus-obtained solid catalyst component was evaluated. Table 3 shows the results.

(2) Propylene Polymerization

Propylene was polymerized in the same manner as in Example 10 except that the solid catalyst component prepared in the above (1) was used in Example 10(2). The thus-obtained polypropylene was evaluated. Table 3 shows the results.

Example 14

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm). The mixture was heated to 40° C., and 8.0 milliliters of silicon tetrachloride (halogen/alkoxy group: 1.0) was added. The mixture was stirred for 4 hours, and then 47 milliliters of titanium tetrachloride was dropwise added. The resultant solution was temperature-increased up to 65° C., 3.4 milliliters of di-n-butyl phthalate was added, and the mixture was temperature-increased up to 125° C. Then, the mixture was stirred at an internal temperature of 125° C. for 1 hour to carry out a contacting procedure. Then, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. The stirring was stopped to precipitate a solid, and a supernatant was withdrawn. This washing procedure was repeated 7 times. Then, 77 milliliters of titanium tetrachloride was added, and the mixture was stirred at an internal temperature of 125° C. for 2 hours to carry out a contacting procedure. The stirring was stopped to precipitate a solid, and a supernatant was withdrawn. Further, 100 milliliters of dehydrated octane was added, and the mixture was stirred at room temperature. The stirring was stopped to precipitate a solid, and a supernatant was withdrawn. This washing procedure was repeated 7 times, to give a solid catalyst component. Table 3 shows the evaluation results thereof.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Example 15

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm). The mixture was heated to 40° C., and 8.0 milliliters of silicon tetrachloride (halogen/alkoxy group: 1.0) was added. The mixture was stirred for 4 hours, and then 3.4 milliliters of di-n-butyl phthalate was added. The resultant solution was temperature-increased up to 65° C., and 47 milliliters of titanium tetrachloride was dropwise added, and the mixture was stirred at an internal temperature of 125° C. for 1 hour to carry out a contacting procedure. Then, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. The stirring was stopped to precipitate a solid, and a supernatant was withdrawn. This washing procedure was repeated 7 times. Then, 77 milliliters of titanium tetrachloride was added, and the mixture was stirred at an internal temperature of 125° C. for 2 hours to carry out a contacting procedure. The stirring was stopped to precipitate a solid, and a supernatant was withdrawn. Further, 100 milliliters of dehydrated octane was added, and the mixture was stirred at room temperature. The stirring was stopped to precipitate a solid, and a supernatant was withdrawn. This washing procedure was repeated 7 times, to give a solid catalyst component. Table 3 shows the evaluation results thereof.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Example 16

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm). The mixture was heated to 40° C., and 8.0 milliliters of silicon tetrachloride (halogen/alkoxy group: 1.0) was added. The mixture was stirred for 4 hours, and then 3.4 milliliters of di-n-butyl phthalate was added, and the mixture was temperature-increased up to 65° C. Then, 47 milliliter of titanium tetrachloride was dropwise added, and the mixture was stirred at an internal temperature of 125° C. for 1 hour to carry out a contacting procedure. Then, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. Then, the stirring was stopped to precipitate a solid, and a supernatant was withdrawn. This washing procedure was repeated 7 times. Then, 77 milliliters of titanium tetrachloride was added, and the mixture was stirred at an internal temperature of 125° C. for 1 hour to carry out a contacting procedure. The stirring was stopped to precipitate a solid, and a supernatant was withdrawn. The above washing with dehydrated octane at 125° C. was repeated 7 times. Further, 77 milliliters of titanium tetrachloride was added again, and the mixture was stirred at an internal temperature of 125° C. for 2 hours to carry out a contacting procedure. Then, the stirring was stopped to precipitate a solid, and a supernatant was withdrawn. Further, 100 milliliters of dehydrated octane was added, and the mixture was stirred at room temperature. The stirring was stopped to precipitate a solid, and a supernatant was withdrawn. This washing procedure was repeated 7 times to give a solid catalyst component. Table 3 shows the evaluation results thereof.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Comparative Example 5

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm). The mixture was heated to 40° C., and 8.0 milliliters of silicon tetrachloride (halogen/alkoxy group: 1.0) was added. The mixture was stirred for 4 hours, and then 3.4 milliliters of di-n-butyl phthalate was added. The resultant solution was temperature-increased up to 65° C., and then 47 milliliter of titanium tetrachloride was dropwise added. The mixture was stirred at an internal temperature of 125° C. for 1 hour to carry out a contacting procedure. Then, the stirring was stopped to precipitate a solid, and a supernatant was withdrawn. Further, 100 milliliters of dehydrated octane was added, and the mixture was stirred at room temperature. The stirring was stopped to precipitate a solid, and a supernatant was withdrawn. This washing procedure was repeated 7 times to give a solid catalyst component. Table 3 shows the evaluation results thereof.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Comparative Example 6

(1) Preparation of Solid Catalyst Component

A solid catalyst component was prepared in the same manner as in Example 14 except that the step of treatment with silicon tetrachloride in Example 14(1) was omitted. The thus-obtained solid catalyst component was evaluated. Table 3 shows the results.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Comparative Example 7

(1) Preparation of Solid Catalyst Component

A solid catalyst component was prepared in the same manner as in Example 14 except that 0.8 milliliter of silicon tetrachloride (halogen/alkoxy group: 0.10) was used in Example 14(1). The thus-obtained solid catalyst component was evaluated. Table 3 shows the results.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Comparative Example 8

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm). The mixture was heated to 50° C., and 4.8 milliliters of silicon tetrachloride (halogen/alkoxy group: 0.60) was added. The mixture was stirred for 20 minutes, and then 2.5 milliliters of diethyl phthalate was added. The resultant solution was temperature-increased up to 70° C., and then 47 milliliter of titanium tetrachloride was dropwise added. The mixture was stirred at an internal temperature of 110° C. for 2 hours to carry out a contacting procedure. Then, the stirring was stopped to precipitate a solid, and a supernatant was withdrawn. To the remaining reaction mixture was added 100 milliliters of dehydrated octane, and the mixture was temperature-increased up to 90° C. with stirring and maintained for 1 minute. Then, the stirring was stopped to precipitate a solid, and a supernatant was withdrawn. This washing procedure was repeated 7 times. Then, 77 milliliters of titanium tetrachloride was added, and the mixture was stirred at an internal temperature of 110° C. for 2 hours to carry out a contacting procedure. The stirring was stopped to precipitate a solid, and a supernatant was withdrawn. Then, 100 milliliters of dehydrated octane was added, and the mixture was stirred at room temperature. The stirring was stopped to precipitate a solid, and a supernatant was withdrawn. This washing procedure was repeated 7 times to give a solid catalyst component. Table 3 shows the evaluation results thereof.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Comparative Example 9

(1) Preparation of Solid Catalyst Component

A solid catalyst component was prepared in the same manner as in Comparative Example 6 except that a support prepared by synthesizing diethoxymagnesium having an average particle diameter (D50) of 540 μm at a reaction temperature of 78° C. without using iodine and pulverizing the diethoxymagnesium with a ball mill for 24 hours was used in Comparative Example 6(1). The thus-obtained solid catalyst component was evaluated. Table 3 shows the results.

(2) Propylene Polymerization

Propylene was polymerized in the same manner as in Example 11 except that the solid catalyst component prepared in the above (1) was used in Example 11(2). The thus-obtained polypropylene was evaluated. Table 3 shows the results.

Comparative Example 10

(1) Preparation of Solid Catalyst Component

A solid catalyst component was prepared in the same manner as in Example 13 except that 2.4 milliliters of silicon tetrachloride (halogen/alkoxy group: 0.30) was used in Example 13(1). The thus-obtained solid catalyst component was evaluated. Table 3 shows the results.

(2) Propylene Polymerization

Propylene was polymerized in the same manner as in Example 10 except that the solid catalyst component prepared in the above (1) was used in Example 10(2). The thus-obtained polypropylene was evaluated. Table 3 shows the results.

As is clearly shown in Table, according to Examples, the solid catalyst components have high polymerization activity, and there can be obtained olefin polymers excellent in powder form.

TABLE 3

|  |  | Unit | Example 10 | Example 11 | Example 12 | Example 13 | Example 14 | Example 15 | Example 16 |
|---|---|---|---|---|---|---|---|---|---|
| Compound (b3) | Initiator |  | $I_2$ | $I_2$ | $I_2$ | $I_2$ | $I_2$ | $I_2$ | $I_2$ |
|  | $X_2$ or YX/Mg | (Gram atom ratio) | 0.0057 | 0.0057 | 0.00019 | 0.019 | 0.019 | 0.019 | 0.019 |
|  | Reaction temperature | (° C.) | 50 | 50 | 50 | 78 | 78 | 78 | 78 |
|  | Average particle diameter ($D_{50}$) | (μm) | 35 | 35 | 10 | 70 | 70 | 70 | 70 |
| Catalyst | Reaction temperature | (° C.) | 125 | 125 | 125 | 125 | 125 | 125 | 125 |
|  | Washing temperature* | (° C.) | 125 | 125→r. t. | 125 | 125 | 125→r. t. | 125→r. t. | 125→r. t. |
|  | Halogen/alkoxy group | (molar ratio) | 1.0 | 1.0 | 1.0 | 1.0 | 1.0 | 1.0 | 1.0 |
|  | Number of times of supporting |  | 2 | 2 | 2 | 2 | 2 | 2 | 3 |
|  | Order of contacting* |  | Si→ID→Ti | Si→ID→Ti | Si→ID→Ti | Si→ID→Ti | Si→Ti→ID | Si→ID→Ti | Si→ID→Ti |
|  | Residual alkoxy group content | (mmol/g) | 0.049 | 0.058 | 0.045 | 0.087 | 0.109 | 0.109 | 0.076 |
|  | Amount of supported Ti | (mmol/g) | 0.340 | 0.564 | 0.411 | 0.334 | 0.618 | 0.511 | 0.507 |
|  | Alkoxy group/Ti | (molar ratio) | 0.14 | 0.10 | 0.11 | 0.26 | 0.18 | 0.18 | 0.15 |
|  | Amount of supported Ti | (wt %) | 1.63 | 2.70 | 1.97 | 1.60 | 2.96 | 2.45 | 2.43 |
|  | Internal donor* |  | DNBP | DNBP | DNBP | DNBP | DNBP | DNBP | DNBP |
|  | External donor* |  | DCPDMS | CHMDMS | DCPDMS | DCPDMS | CHMDMS | CHMDMS | CHMDMS |
| Olefin ploymer | Polymerization activity | (kg/g-Ti) | 1470 | 600 | 1350 | 750 | 470 | 400 | 420 |
|  | Polymerization activity | (kg/g-Cat) | 23.9 | 16.1 | 26.6 | 12.0 | 13.9 | 9.8 | 10.2 |
|  | [η] | (dL/g) | 1.54 | 1.25 | 1.40 | 1.46 | 1.27 | 1.17 | 1.21 |
|  | Stereoregularity | (mol %) | 99.7 | 98.0 | 99.5 | 99.5 | 98.0 | 98.1 | 98.1 |
|  | Average particle diameter ($D_{50}$) | (μm) | 610 | 590 | 200 | 1400 | 1420 | 1230 | 1280 |
|  | Fine powder amount (<250 μm) | (wt %) | 4.7 | 2.2 | 35.5 | 3.8 | 6.0 | 5.2 | 4.8 |
|  | Coarse powder amount (>2830 μm) | (wt %) | 1.6 | 1.3 | 0.2 | 0.4 | 0.1 | 0.4 | 0.5 |
|  | Bulk density | (g/mL) | 0.41 | 0.41 | 0.36 | 0.34 | 0.33 | 0.33 | 0.34 |

|  |  | Unit | Comparative Example 5 | Comparative Example 6 | Comparative Example 7 | Comparative Example 8 | Comparative Example 9 | Comparative Example 10 |
|---|---|---|---|---|---|---|---|---|
| Compound (b3) | Initiator |  | $I_2$ | $I_2$ | $I_2$ | $I_2$ | — | $I_2$ |
|  | $X_2$ or YX/Mg | (Gram atom ratio) | 0.019 | 0.019 | 0.019 | 0.019 | 0 | 0.019 |
|  | Reaction temperature | (° C.) | 78 | 78 | 78 | 78 | 78 | 78 |
|  | Average particle diameter ($D_{50}$) | (μm) | 70 | 70 | 70 | 70 | 540 | 70 |
| Catalyst | Reaction temperature | (° C.) | 125 | 125 | 125 | 110 | 110 | 125 |
|  | Washing temperature* | (° C.) | r. t. | 125→r. t. | 125→r. t. | 90→r. t. | 90→r. t. | 125 |
|  | Halogen/alkoxy group | (molar ratio) | 1.0 | 0 | 0.10 | 0.60 | 0.60 | 0.30 |

TABLE 3-continued

|  | | | | | | | | |
|---|---|---|---|---|---|---|---|---|
| | Number of times of supporting | | 1 | 2 | 2 | 2 | 2 | 2 |
| | Order of contacting* | | Si→ID→Ti | Ti→ID | Si→Ti→ID | Si→ID→Ti | Si→ID→Ti | Si→ID→Ti |
| | Residual alkoxy group content | (mmol/g) | 0.369 | 0.266 | 0.222 | 0.199 | 0.533 | 0.135 |
| | Amount of supported Ti | (mmol/g) | 0.737 | 0.806 | 0.693 | 0.585 | 0.751 | 0.386 |
| | Alkoxy group/Ti | (molar ratio) | 0.50 | 0.33 | 0.32 | 0.34 | 0.71 | 0.35 |
| | Amount of supported Ti | (wt %) | 3.53 | 3.86 | 3.32 | 2.80 | 3.60 | 1.85 |
| | Internal donor* | | DNBP | DNBP | DNBP | DEP | DEP | DNBP |
| | External donor* | | CHMDMS | CHMDMS | CHMDMS | CHMDMS | CHMDMS | DCPDMS |
| Olefin ploymer | Polymerization activity | (kg/g-Ti) | 170 | 240 | 290 | 220 | 100 | 550 |
| | Polymerization activity | (kg/g-Cat) | 6.0 | 9.3 | 9.6 | 6.2 | 3.6 | 10.2 |
| | [η] | (dL/g) | 1.10 | 1.20 | 1.23 | 1.19 | 1.08 | 1.35 |
| | Stereoregularity | (mol %) | 96.6 | 97.4 | 97.6 | 96.8 | 96.3 | 99.2 |
| | Average particle diameter ($D_{50}$) | (μm) | 900 | 960 | 1050 | 1020 | 490 | 1200 |
| | Fine powder amount (<250 μm) | (wt %) | 4.5 | 13.4 | 9.8 | 3.3 | 15.0 | 6.1 |
| | Coarse powder amount (>2830 μm) | (wt %) | 1.0 | 3.8 | 2.0 | 0.8 | 2.0 | 1.2 |
| | Bulk density | (g/mL) | 0.31 | 0.26 | 0.29 | 0.31 | 0.25 | 0.31 |

Washing temperature: r. t.: room temperature
Order of contacting: Ti: titanium tetrachloride (compound (a3)), ID: Internal donor (compound (d3)), Si: Silicon tetrachloride (compound (c3))
Internal donor species: DNBP: di-n-butyl phthalate, DEP: diethyl phthalate
External donor species: DCPDMS: dicyclopentyldimethoxysilane, CHMDMS: cyclohexylmethyldimethoxysilane Example 17

(1) Preparation of Solid Catalyst Component

A three-necked flask with a stirrer, having an internal volume of 0.5 liter, was subjected to replacement of an atmosphere therein with nitrogen gas, and then charged with 128 milliliters of dehydrated ethylbenzene and 16 g of diethoxymagnesium (prepared by reacting metal magnesium, ethanol and iodine at an iodine/Mg gram atom ratio of 0.0057 at a reaction temperature of 50° C., $D_{50}$: 35 μm). At 5° C., 64 milliliters of titanium tetrachloride was dropwise added, the mixture was temperature-increased up to 90° C., and then, 4.3 milliliters of di-n-butyl phthalate was added. The resultant solution was further temperature-increased and stirred at an internal temperature of 125° C. for 2 hours to carry out a contacting procedure. Then, the stirring was stopped to precipitate a solid, and a supernatant was withdrawn. To the remaining reaction mixture was added 240 milliliters of dehydrated ethylbenzene, and the mixture was temperature-increased up to 125° C. with stirring and maintained for 1 minute. Then, the stirring was stopped to precipitate a solid, and a supernatant was withdrawn. This washing procedure was repeated twice. Further, 96 milliliters of dehydrated ethylbenzene and 64 milliliters of titanium tetrachloride were added, and the mixture was stirred at an internal temperature of 125° C. for 2 hours to carry out a contacting procedure. The stirring was stopped to precipitate a solid, and a supernatant was withdrawn. The above washing procedure was repeated twice. Then, 100 milliliters of dehydrated octane was added, and the mixture was temperature-increased up to 125° C. with stirring and maintained for 1 minute. Then, the stirring was stopped to precipitate a solid, and a supernatant was withdrawn. This washing procedure was repeated four times, and the resultant solid catalyst component was evaluated. Table 4 shows the results.

(2) Propylene Polymerization

An autoclave made of stainless steel with a stirrer, having an internal volume of 1 liter, was fully dried and subjected to replacement of an atmosphere therein with nitrogen, and then the autoclave was charged with 400 milliliters of dehydrated heptane at room temperature. The autoclave was further charged with 2.0 mmol of triethylaluminum, 0.25 mmol of dicyclopentyldimethoxysilane and 0.0025 mmol, as Ti atom, of the solid catalyst component prepared in the above (1), and hydrogen was introduced up to 0.1 MPa. Then, while propylene was introduced, the autoclave was temperature-increased to 80° C. and pressure-increased to a total pressure of 0.8 MPa, followed by polymerization for 1 hour. Then, the temperature and the pressure in the autoclave were decreased, and the reaction product was taken out and poured into 2 liters of methanol to deactivate the catalyst. The product was separated by filtration and vacuum-dried to give a polypropylene. Table 4 shows the evaluation results thereof.

Example 18

(1) Preparation of Solid Catalyst Component

A solid catalyst component was obtained in the same manner as in Example 17 except that the temperature for the washing with the octane after the titanium-tetrachloride-supporting reaction carried out for the second time in Example 17(1) was changed to room temperature, and the thus-obtained solid catalyst component was evaluated. Table 4 shows the results.

(2) Propylene Polymerization

Propylene was polymerized in the same manner as in Example 17 except that the procedures in Example 17(2)

were modified so that the dicyclopentyldimethoxysilane was replaced with 0.5 mmol of cyclohexylmethyldimethoxysilane, that 0.005 mmol, as Ti atom, of the solid catalyst component prepared in the above (1) was added and that hydrogen was introduced up to 0.05 MPa. The thus-obtained polypropylene was evaluated. Table 4 shows the results.

Example 19

(1) Preparation of Solid Catalyst Component

A solid catalyst component was obtained in the same manner as in Example 17 except that diethoxymagnesium having an average particle diameter (D50) of 10 μm, prepared at an iodine/Mg gram atom ratio of 0.00019 at a reaction temperature of 50° C., was used in Example 17(1). The thus-obtained solid catalyst component was evaluated. Table 4 shows the results.

(2) Propylene Polymerization

Propylene was polymerized in the same manner as in Example 17 except that the solid catalyst component prepared in the above (1) was used in Example 17(2). The thus-obtained polypropylene was evaluated. Table 4 shows the results.

Example 20

(1) Preparation of Solid Catalyst Component

A solid catalyst component was obtained in the same manner as in Example 17 except that diethoxymagnesium having an average particle diameter (D50) of 70 μm, prepared at an iodine/Mg gram atom ratio of 0.019 at a reaction temperature of 78° C., was used In Example 17(1). The thus-obtained solid catalyst component was evaluated. Table 4 shows the results.

(2) Propylene Polymerization

Propylene was polymerized in the same manner as in Example 17 except that the solid catalyst component prepared in the above (1) was used in Example 17(2). The thus-obtained polypropylene was evaluated. Table 4 shows the results.

Example 21

(1) Preparation of Solid Catalyst Component

A three-necked flask with a stirrer, having an internal volume of 0.5 liter, was subjected to replacement of an atmosphere therein with nitrogen gas, and then charged with 128 milliliters of dehydrated p-xylene and 16 g of diethoxymagnesium (prepared by reacting metal magnesium, ethanol and iodine at an iodine/Mg gram atom ratio of 0.019 at a reaction temperature of 78° C., D50: 70 μm). At 5° C., 64 milliliters of titanium tetrachloride was dropwise added, the mixture was temperature-increased up to 90° C., and then 4.3 milliliters of di-n-butyl phthalate was added. The resultant solution was further temperature-increased and stirred at 130° C. for 2 hours to carry out a contacting procedure. Then, the stirring was stopped to precipitate a solid, and a supernatant was withdrawn. To the remaining reaction mixture was added 240 milliliters of dehydrated p-xylene, and the mixture was temperature-increased up to 130° C. with stirring and maintained for 1 minute. Then, the stirring was stopped to precipitate a solid, and a supernatant was withdrawn. This washing procedure was repeated twice. Further, 96 milliliters of dehydrated p-xylene and 64 milliliters of titanium tetrachloride were added, and the mixture was stirred at an internal temperature of 130° C. for 2 hours to carry out a contacting procedure. Then, the stirring was stopped to precipitate a solid, and a supernatant was withdrawn. The above washing procedure was carried out twice. Then, 100 milliliters of dehydrated octane was added, and the mixture was temperature-increased up to 130° C. with stirring and maintained for 1 minute. Then, the stirring was stopped to precipitate a solid, and a supernatant was withdrawn. This washing procedure was repeated four times. The thus-obtained solid catalyst component was evaluated. Table 4 shows the results.

(2) Propylene Polymerization

Propylene was polymerized in the same manner as in Example 17 except that the solid catalyst component prepared in the above (1) was used in Example 17(2). The thus-obtained polypropylene was evaluated. Table 4 shows the results.

Example 22

(1) Preparation of Solid Catalyst Component

A solid catalyst component was obtained in the same manner as in Example 17 except that the procedures in Example 17(1) were modified so that diethoxymagnesium having an average particle diameter (D50) of 70 μm, prepared at an iodine/Mg gram atom ratio of 0.019 at a reaction temperature of 78° C., was used and that the temperature for the washing with the octane after the titanium-tetrachloride-supporting reaction carried out for the second time was changed to room temperature. The thus-obtained solid catalyst component was evaluated. Table 4 shows the results.

(2) Propylene Polymerization

Propylene was polymerized in the same manner as in Example 17 except that the solid catalyst component prepared in the above (1) was used in Example 17(2). The thus-obtained polypropylene was evaluated. Table 4 shows the results.

Example 23

(1) Preparation of Solid Catalyst Component

A three-necked flask with a stirrer, having an internal volume of 0.5 liter, was subjected to replacement of an atmosphere therein with nitrogen gas, and then charged with 128 milliliters of dehydrated ethylbenzene and 16 g of diethoxymagnesium (prepared by reacting metal magnesium, ethanol and iodine at an iodine/Mg gram atom ratio of 0.019 at a reaction temperature of 78° C., D50: 70 μm). At 5° C., 64 milliliters of titanium tetrachloride was dropwise added, the mixture was temperature-increased up to 90° C., and then 4.3 milliliters of di-n-butyl phthalate was added. The resultant solution was further temperature-increased and stirred at an internal temperature of 125° C. for 2 hours to carry out a contacting procedure. Then, the stirring was stopped to precipitate a solid, and a supernatant was withdrawn. To the remaining reaction mixture was added 240 milliliters of dehydrated ethylbenzene, and the mixture was temperature-increased up to 125° C. with stirring and maintained for 1 minute. Then, the stirring was stopped to precipitate a solid, and a supernatant was withdrawn. This washing procedure was repeated twice. Then, 96 milliliters of dehydrated ethylbenzene and 64 milliliters of titanium tetrachloride were added, and the mixture was stirred at an internal temperature of 125° C. for 2 hours to carry out a contacting procedure. The stirring was stopped to precipitate a solid, and a supernatant was withdrawn. The above washing procedure was carried out twice. Further, 96 milliliters of dehydrated ethylbenzene and 64 milliliters of titanium tetrachloride were added, and the mixture was stirred at an internal temperature of 125° C. for 2 hours to carry out a contacting procedure. The stirring was stopped to precipitate a solid, and a supernatant was withdrawn. The above washing procedure was carried out twice. Then, 100 milliliters of dehydrated octane was added, and the mixture was stirred at room temperature. The stirring was stopped to precipitate a solid, and a supernatant was withdrawn. This washing procedure was repeated four times. The thus-obtained solid catalyst component was evaluated. Table 4 shows the results.

(2) Propylene Polymerization

Propylene was polymerized in the same manner as in Example 18 except that the solid catalyst component prepared in the above (1) was used in Example 18(2). The thus-obtained polypropylene was evaluated. Table 4 shows the results.

Comparative Example 11

(1) Preparation of Solid Catalyst Component

A three-necked flask with a stirrer, having an internal volume of 0.5 liter, was subjected to replacement of an atmosphere therein with nitrogen gas, and then charged with 128 milliliters of dehydrated ethylbenzene and 16 g of diethoxymagnesium (prepared by reacting metal magnesium, ethanol and iodine at an iodine/Mg gram atom ratio of 0.019 at a reaction temperature of 78° C., D50: 70 μm). At 5° C., 64 milliliters of titanium tetrachloride was dropwise added, the mixture was temperature-increased up to 90° C., and then 4.3 milliliters of di-n-butyl phthalate was added. The resultant solution was further temperature-increased and stirred at 125° C. for 2 hours to carry out a contacting procedure. Then, the stirring was stopped to precipitate a solid, and a supernatant was withdrawn. To the remaining reaction mixture was added 240 milliliters of dehydrated ethylbenzene, and the mixture was temperature-increased up to 125° C. with stirring and maintained for 1 minute. Then, the stirring was stopped to precipitate a solid, and a supernatant was withdrawn. This washing procedure was repeated twice. Further, 100 milliliters of dehydrated octane was added, and the mixture was stirred at room temperature. The stirring was stopped to precipitate a solid, and a supernatant was withdrawn. This washing procedure was repeated four times. The thus-obtained solid catalyst component was evaluated. Table 4 shows the results.

(2) Propylene Polymerization

Propylene was polymerized in the same manner as in Example 18 except that the solid catalyst component prepared in the above (1) was used in Example 18(2). The thus-obtained polypropylene was evaluated. Table 4 shows the results.

Comparative Example 12

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm), and 47 milliliters of titanium tetrachloride was dropwise added at 40° C. The resultant solution was further temperature-increased up to 65° C., and 3.4 milliliters of di-n-butyl phthalate was added. Then, the mixture was temperature-increased up to 125° C. and then stirred at an internal temperature of 125° C. for 1 hour to carry out a contacting procedure. Then, the stirring was stopped to precipitate a solid, and a supernatant was withdrawn. To the remaining reaction mixture was added 100 milliliters of dehydrated octane, and the mixture was temperature-increased up to 125° C. with stirring and maintained for 1 minute. Then, the stirring was stopped to precipitate a solid, and a supernatant was withdrawn. This washing procedure was repeated 7 times. Then, 77 milliliters of titanium tetrachloride was added, and the mixture was stirred at an internal temperature of 125° C. for 2 hours to carry out a contacting procedure. The stirring was stopped to precipitate a solid, and a supernatant was withdrawn. Further, 100 milliliters of dehydrated octane was added, and the mixture was stirred at room temperature. The stirring was stopped to precipitate a solid, and a supernatant was withdrawn. This washing procedure was repeated 7 times. The thus-obtained solid catalyst component was evaluated. Table 4 shows the results.

(2) Propylene Polymerization

Propylene was polymerized in the same manner as in Example 18 except that the solid catalyst component prepared in the above (1) was used in Example 18(2). The thus-obtained polypropylene was evaluated. Table 4 shows the results.

Comparative Example 13

(1) Preparation of Solid Catalyst Component

A three-necked flask with a stirrer, having an internal volume of 0.5 liter, was subjected to replacement of an atmosphere therein with nitrogen gas, and then charged with 80 milliliters of dehydrated octane and 16 g of diethoxymagnesium (prepared by reacting metal magnesium, ethanol and iodine at an iodine/Mg gram atom ratio of 0.019 at a reaction temperature of 78° C., D50: 70 μm). The mixture was heated to 50° C., and 2.4 milliliters of silicon tetrachloride was added. The mixture was stirred for 20 minutes, and then 2.5 milliliters of diethyl phthalate was added. The resultant solution was temperature-increased up to 70° C., then, 47 milliliters of titanium tetrachloride was dropwise added, and the mixture was stirred at an internal temperature of 110° C. for 2 hours to carry out a contacting procedure. Then, the stirring was stopped to precipitate a solid, a supernatant was withdrawn, 100 milliliters of dehydrated octane was added, and the mixture was temperature-increased up to 90° C. with stirring and maintained for 1 minute. Then, the stirring was stopped to precipitate a solid, and a supernatant was withdrawn. This washing procedure was repeated 7 times. Then, 77 milliliters of titanium tetrachloride was added, and the mixture was stirred at an internal temperature of 110° C. for 2 hours to carry out a contacting procedure. The stirring was stopped to precipitate a solid, and a supernatant was withdrawn. Then, 100 milliliters of dehydrated octane was added, the mixture was stirred at room temperature, the stirring was stopped to precipitate a solid, and a supernatant was withdrawn. This washing procedure was repeated 7 times, and the thus-obtained solid catalyst component was evaluated. Table 4 shows the results.

(2) Propylene Polymerization

Propylene was polymerized in the same manner as in Example 18 except that the solid catalyst component prepared in the above (1) was used in Example 18(2). The thus-obtained polypropylene was evaluated. Table 4 shows the results.

Comparative Example 14

(1) Preparation of Solid Catalyst Component

A three-necked flask with a stirrer, having an internal volume of 0.5 liter, was subjected to replacement of an atmosphere therein with nitrogen gas, and then charged with 128 milliliters of dehydrated ethylbenzene and 16 g of diethoxymagnesium (prepared by reacting metal magnesium, ethanol and iodine at an iodine/Mg gram atom ratio of 0.019 at a reaction temperature of 78° C., D50: 70 μm). At 5° C., 32 milliliters of titanium tetrachloride was dropwise added, the mixture was temperature-increased up to 90° C., and then 4.3 milliliters of di-n-butyl phthalate was added. The resultant solution was temperature-increased and stirred at an internal temperature of 115° C. for 2 hours to carry out a contacting procedure. Then, the stirring was stopped to precipitate a solid, and a supernatant was withdrawn. To the remaining reaction mixture was added 160 milliliters of dehydrated ethylbenzene, and the mixture was temperature-increased up to 115° C. with stirring and maintained for 1 minute. Then, the stirring was stopped to precipitate a solid, and a supernatant was withdrawn. This washing procedure was repeated twice. Further, 96 milliliters of dehydrated ethylbenzene and 32 milliliters of titanium tetrachloride were added, and the mixture was stirred at an internal temperature of 115° C. for 2 hours to carry out a contacting procedure. The stirring was stopped to precipitate a solid, and a supernatant was withdrawn. Then, 200 milliliters of dehydrated octane was added, the mixture was stirred at room temperature, the stirring was stopped to precipitate a solid, and a supernatant was withdrawn. This washing procedure was repeated 10 times, and the thus-obtained solid catalyst component was evaluated. Table 4 shows the results.

(2) Propylene Polymerization

Propylene was polymerized in the same manner as in Example 18 except that the solid catalyst component prepared in the above (1) was used in Example 18(2). The thus-obtained polypropylene was evaluated. Table 4 shows the results.

Comparative Example 15

(1) Preparation of Solid Catalyst Component

A solid catalyst component was prepared in the same manner as in Comparative Example 14 except that a support prepared by synthesizing diethoxymagnesium having an average particle diameter (D50) of 540 μm at a reaction temperature of 78° C. without using iodine and pulverizing the diethoxymagnesium with a ball mill for 24 hours was used in Comparative Example 14(1). The thus-obtained solid catalyst component was evaluated. Table 4 shows the results.

(2) Propylene Polymerization

Propylene was polymerized in the same manner as in Example 18 except that the solid catalyst component prepared in the above (1) was used in Example 18(2). The thus-obtained polypropylene was evaluated. Table 4 shows the results.

As is clearly shown in Table, according to Examples, the solid catalyst components have high polymerization activity, and there can be obtained olefin polymers excellent in powder form.

TABLE 4

| | | Unit | Example 17 | Example 18 | Example 19 | Example 20 | Example 21 | Example 22 | Example 23 |
|---|---|---|---|---|---|---|---|---|---|
| Compound (b4) | Initiator species | | $I_2$ | $I_2$ | $I_2$ | $I_2$ | $I_2$ | $I_2$ | $I_2$ |
| | $X_2$ or YX/Mg | (Gram atom ratio) | 0.0057 | 0.0057 | 0.00019 | 0.019 | 0.019 | 0.019 | 0.019 |
| | Reaction temperature | (° C.) | 50 | 50 | 50 | 78 | 78 | 78 | 78 |
| | $D_{50}$ | (μm) | 35 | 35 | 10 | 70 | 70 | 70 | 70 |
| Catalyst | Temperature for supporting | (° C.) | 125 | 125 | 125 | 125 | 130 | 125 | 125 |
| | Washing temperature* | (° C.) | 125 | 125→r. t. | 125 | 125 | 130 | 125→r. t. | 125→r. t. |
| | Preparation solvent* | | EB | EB | EB | EB | XL | EB | EB |
| | Chlorinating agent species | | — | — | — | — | — | — | — |
| | Number of times of supporting | | 2 | 2 | 2 | 2 | 2 | 2 | 3 |
| | Order of contacting* | | Ti→ID | Ti→ID | Ti→ID | Ti→ID | Ti→ID | Ti→ID | Ti→ID |
| | Residual alkoxy group content | (mmol/g) | 0.048 | 0.065 | 0.063 | 0.114 | 0.100 | 0.146 | 0.098 |
| | Amount of supported Ti | (mmol/g) | 0.484 | 0.727 | 0.528 | 0.520 | 0.501 | 0.695 | 0.574 |
| | Alkoxy group/Ti | (molar ratio) | 0.10 | 0.09 | 0.12 | 0.22 | 0.20 | 0.21 | 0.17 |
| | Amount of supported Ti | (wt %) | 2.32 | 3.48 | 2.53 | 2.49 | 2.40 | 3.33 | 2.75 |
| Olefin polymer | Polymerization activity | (kg/g-Ti) | 1310 | 580 | 1360 | 820 | 830 | 390 | 450 |
| | Polymerization activity | (kg/g-Cat) | 30.3 | 20.1 | 34.4 | 20.4 | 19.9 | 13.0 | 12.4 |
| | [η] | (dL/g) | 1.44 | 1.28 | 1.42 | 1.46 | 1.50 | 1.22 | 1.24 |
| | Stereoregularity | (mol %) | 99.6 | 98.2 | 99.5 | 99.5 | 99.6 | 98.2 | 98.4 |
| | $D_{50}$ | (μm) | 730 | 600 | 760 | 1600 | 1610 | 1450 | 1400 |
| | Fine powder amount (<250 μm) | (wt %) | 1.7 | 1.9 | 1.5 | 3.9 | 4.0 | 6.7 | 6.5 |
| | Coarse powder | (wt %) | 1.7 | 1.5 | 1.9 | 0.5 | 0.4 | 0.3 | 0.4 |

TABLE 4-continued

| | | amount (>2830 μm) | | | | | | |
|---|---|---|---|---|---|---|---|---|
| | Bulk density | (g/mL) | 0.40 | 0.41 | 0.36 | 0.35 | 0.34 | 0.33 | 0.34 |

| | | Unit | Comparative Example 11 | Comparative Example 12 | Comparative Example 13 | Comparative Example 14 | Comparative Example 15 |
|---|---|---|---|---|---|---|---|
| Compound (b4) | Initiator species | | $I_2$ | $I_2$ | $I_2$ | $I_2$ | — |
| | $X_2$ or YX/Mg | (Gram atom ratio) | 0.019 | 0.019 | 0.019 | 0.019 | 0 |
| | Reaction temperature | (° C.) | 78 | 78 | 78 | 78 | 78 |
| | $D_{50}$ | (μm) | 70 | 70 | 70 | 70 | 540 |
| Catalyst | Temperature for supporting | (° C.) | 125 | 125 | 110 | 115 | 115 |
| | Washing temperature* | (° C.) | 125→r. t. | 125→r. t. | 90→r. t. | 115→r. t. | 115→r. t. |
| | Preparation solvent* | | EB | OC | OC | EB | EB |
| | Chlorinating agent species | | — | — | $SiCl_4$ | — | — |
| | Number of times of supporting | | 1 | 2 | 2 | 2 | 2 |
| | Order of contacting* | | Ti→ID | Ti→ID | Si→ID→Ti | Ti→ID | Ti→ID |
| | Residual alkoxy group content | (mmol/g) | 0.277 | 0.266 | 0.206 | 0.155 | 0.456 |
| | Amount of supported Ti | (mmol/g) | 0.770 | 0.806 | 0.605 | 0.553 | 0.760 |
| | Alkoxy group/Ti | (molar ratio) | 0.36 | 0.33 | 0.34 | 0.28 | 0.60 |
| | Amount of supported Ti | (wt %) | 3.69 | 3.86 | 2.90 | 2.65 | 3.64 |
| Olefin polymer | Polymerization activity | (kg/g-Ti) | 220 | 240 | 220 | 340 | 150 |
| | Polymerization activity | (kg/g-Cat) | 8.1 | 9.3 | 6.3 | 9.0 | 5.5 |
| | [η] | (dL/g) | 1.11 | 1.20 | 1.19 | 1.13 | 1.18 |
| | Stereoregularity | (mol %) | 96.6 | 97.4 | 96.8 | 98.1 | 96.5 |
| | $D_{50}$ | (μm) | 1180 | 960 | 1020 | 1030 | 610 |
| | Fine powder amount (<250 μm) | (wt %) | 4.9 | 13.4 | 3.3 | 5.0 | 18.0 |
| | Coarse powder amount (>2830 μm) | (wt %) | 0.8 | 3.8 | 0.8 | 0.2 | 2.7 |
| | Bulk density | (g/mL) | 0.31 | 0.26 | 0.31 | 0.36 | 0.28 |

Contacting temperature: r. t.: room temperature
Preparation solvent: EB: ethylbenzene, XL: p-xylene, OC: octane
Order of contacting: Ti: titanium tetrachloride (compound (a4)), ID: internal donor (compound (c4)), Si: silicon tetrachloride

INDUSTRIAL UTILITY

According to the present invention, there can be provided a solid catalyst component and a solid catalyst for olefin polymerization which has high polymerization activity and can give an olefin polymer whose residual Cl content is small and which is excellent in stereoregularity and powder form, and a process for producing an olefin polymer.

The invention claimed is:

1. A solid catalyst component for olefin polymerization, which is a reaction product from the following compounds (a1), (b1), (c1), (d1) and (e) and in which the molar ratio (RO/Ti) of residual alkoxy groups (RO) to supported titanium (Ti) is 0.60 or less,
   (a1) an oxide of at least one element that is selected from Group II to Group IV elements and that supports an alcohol-free halogen-containing magnesium compound,
   (b1) an alcohol,
   (c1) a halogen-containing silicon compound,
   (d1) an electron-donating compound, and
   (e) a halogen-containing titanium compound.

2. The solid catalyst component for olefin polymerization as recited in claim 1, wherein said alcohol (b1) is ethanol.

3. The solid catalyst component for olefin polymerization as recited in claim 1, wherein said halogen-containing silicon compound (c1) is silicon tetrachloride.

4. The solid catalyst component for olefin polymerization as recited in claim 1, wherein said molar ratio (RO/Ti) is 0.45 or less.

5. The solid catalyst component for olefin polymerization as recited in claim 1, which has a residual alkoxy group (RO) content of 0.40 mmol/g or less.

6. The solid catalyst component for olefin polymerization as recited in claim 1, which has a supported-titanium amount of 1.0% by weight or more.

7. A solid catalyst component for olefin polymerization, which is a reaction product obtained by reacting the following compounds (a3) to (c3) or the following compounds (a3) to (d3) and in which the molar ratio (RO/Ti) of residual alkoxy groups (RO) to supported titanium (Ti) is 0.30 or less,
   (a3) a halogen-containing titanium compound,
   (b3) an alkoxy-group-containing magnesium compound,
   (c3) a halogen-containing silicon compound,
   (d3) an electron-donating compound.

8. The solid catalyst component for olefin polymerization as recited in claim 7, wherein said compound (a3) is a halogen-containing silicon compound whose amount, as a molar ratio of the halogen thereof to the alkoxy group of said compound (b3), is 0.50 or more.

9. The solid catalyst component for olefin polymerization as recited in claim 7, wherein said compound (b3) is a compound obtained by reacting metal magnesium, an alcohol and a halogen and/or halogen-containing compound containing at least 0.0001 gram atom of halogen atom per mole of said metal magnesium.

10. The solid catalyst component for olefin polymerization as recited in claim 9, wherein the metal magnesium, the alcohol and the halogen and/or halogen-containing compound are reacted at a temperature of 30 to 60° C.

11. The solid catalyst component for olefin polymerization as recited in claim 7, wherein said compound (b3) has an average particle diameter (D50) of 50 μm or less.

12. The solid catalyst component for olefin polymerization as recited in claim 7, wherein said compound (b3) is dialkoxymagnesium.

13. The solid catalyst component for olefin polymerization as recited in claim 7, wherein said compound (c3) is silicon tetrachloride.

14. The solid catalyst component for olefin polymerization as recited in claim 7, wherein said molar ratio (RO/Ti) is 0.20 or less.

15. The solid catalyst component for olefin polymerization as recited in claim 7, which has a residual alkoxy group (RO) content of 0.13 mmol/g or less.

16. The solid catalyst component for olefin polymerization as recited in claim 7, which has a supported-titanium antount of at least 1.5% by weight.

17. A solid catalyst component for olefin polymerization, which is a reaction product obtained by reacting the following compounds (a4) and (b4) or the following compounds (a4), (b4) and (c4) in the presence of an aromatic hydrocarbon solvent and in which the molar ratio (RO/Ti) of residual alkoxy groups (RO) to supported titanium (Ti) is 0.25 or less,
   (a4) a halogen-containing titanium compound,
   (b4) an alkoxy-group-containing magnesium compound, and
   (c4) an electron-donating compound.

18. The solid catalyst component for olefin polymerization as recited in claim 17, wherein said compound (b4) is an alkoxy-group-containing magnesium compound obtained by reacting metal magnesium, an alcohol and a halogen and/or halogen-containing compound containing at least 0.0001 gram atom of halogen atom per mole of said metal magnesium.

19. The solid catalyst component for olefin polymerization as recited in claim 18, wherein said metal magnesium, said alcohol and said halogen and/or halogen-containing compound are reacted at a temperature of 30 to 60° C.

20. The solid catalyst component for olefin polymerization as recited in claim 17, wherein said compound (b4) is dialkoxymagnesium.

21. The solid catalyst component for olefin polymerization as recited in claim 17, wherein said compound (b4) has an average particle diameter (D50) of 50 μm or less.

22. The solid catalyst component for olefin polymerization as recited in claim 17, wherein said molar ratio (RO/Ti) is 0.15 or less.

23. The solid catalyst component for olefin polymerization as recited in claim 17, which has a residual alkoxy group content (RO) of 0.15 mmol/g or less.

24. The solid catalyst component for olefin polymerization as recited in claim 17, which has a supported-titanium amount of at least 1.5% by weight.

25. A catalyst for olefin polymerization, comprising the following components [A] and [B] or the following components [A], [B] and [C],
   [A] the solid catalyst component for olefin polymerization as recited in any one of claims 1, 7, and 17,
   [B] an organic aluminum compound, and
   [C] an electron-donating compound.

26. A process for producing an olefin polymer, comprising polymerizing an olefin in the presence of the catalyst for olefin polymerization as recited in claim 25.

* * * * *

UNITED STATES PATENT AND TRADEMARK OFFICE
CERTIFICATE OF CORRECTION

| | | |
|---|---|---|
| PATENT NO. | : 7,071,138 B2 | Page 1 of 1 |
| APPLICATION NO. | : 10/493550 | |
| DATED | : July 4, 2006 | |
| INVENTOR(S) | : Shojiro Tanase et al. | |

It is certified that error appears in the above-identified patent and that said Letters Patent is hereby corrected as shown below:

On Title Page 1, column 1, item 73 "Assignee," change "Idemitsu Petrochemical Co., Ltd." to -- Idemitsu Kosan Co., Ltd.--.

Signed and Sealed this

Twenty-fourth Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,071,138 B2 | Page 1 of 1 |
| APPLICATION NO. | : 10/493550 | |
| DATED | : July 4, 2006 | |
| INVENTOR(S) | : Shojiro Tanase et al. | |

It is certified that error appears in the above-identified patent and that said Letters Patent is hereby corrected as shown below:

On Title page
Item 73
    On Page 1, column 1, under "Assignee," change "Idemitsu Petrochemical Co., Ltd." to --Idemitsu Kosan Co., Ltd.--.

Signed and Sealed this

Fourteenth Day of August, 2007

JON W. DUDAS
*Director of the United States Patent and Trademark Office*